US012197992B2

(12) United States Patent
Lee et al.

(10) Patent No.: US 12,197,992 B2
(45) Date of Patent: Jan. 14, 2025

(54) POWER ADAPTER

(71) Applicant: Ximplar Limited, Hong Kong (HK)

(72) Inventors: Pui Tong Paul Lee, Hong Kong (HK); Ka Kui Cheng, Hong Kong (HK); Kin Hin Wong, Hong Kong (HK)

(73) Assignee: Ximplar Limited, Hong Kong (HK)

( * ) Notice: Subject to any disclaimer, the term of this patent is extended or adjusted under 35 U.S.C. 154(b) by 150 days.

(21) Appl. No.: 17/965,780

(22) Filed: Oct. 14, 2022

(65) Prior Publication Data

US 2023/0031199 A1 Feb. 2, 2023

Related U.S. Application Data

(63) Continuation-in-part of application No. 16/935,235, filed on Jul. 22, 2020, now abandoned.

(60) Provisional application No. 62/877,321, filed on Jul. 23, 2019.

(51) Int. Cl.
G06K 7/10 (2006.01)

(52) U.S. Cl.
CPC ................. G06K 7/10366 (2013.01)

(58) Field of Classification Search
CPC . G06K 7/10366; G01S 5/0252; G01S 5/0295; G01S 11/06; G01S 5/14; G08B 13/14; G08B 21/0202; H04W 4/33; H04W 4/80; H04W 4/029; H04B 5/00
See application file for complete search history.

(56) References Cited

U.S. PATENT DOCUMENTS 5,408,513 A 4/1995 Busch, Jr et al.
11,184,739 B1 11/2021 Wellig et al.
2011/0143785 A1 6/2011 Cohen et al.
2013/0164971 A1 6/2013 Chung et al.
2015/0366039 A1 12/2015 Noori et al.
(Continued)

FOREIGN PATENT DOCUMENTS

CN 102707691 A 10/2012
CN 104124739 A 10/2014
(Continued)

OTHER PUBLICATIONS

First Office Action of corresponding China patent application No. 202010713614.X mailed on Oct. 31, 2022.

Primary Examiner — James J Yang
(74) Attorney, Agent, or Firm — Idea Intellectual Limited; Margaret A. Burke; Sam T. Yip

(57) ABSTRACT

A method, a power adapter and a system for determining a location of the power adapter are provided. The method includes: determining whether the power input plug is engaged with an AC power output wall socket of a power source; if the power input plug is not engaged with the AC power output wall socket, instructing the beacon circuit module to broadcast tag information corresponding to the power adapter; else if the power input plug is engaged with the AC power output wall socket, enabling the tag reader to read a tag circuit of the power source; identifying an identification number detected from the tag circuit; determining a location of the power adapter according to the identification number and a location mapping table; sending a plug notification to a remote control center; and instructing the beacon circuit module for receiving a further tag information of a further power adapter.

8 Claims, 17 Drawing Sheets

(56) References Cited

U.S. PATENT DOCUMENTS

| | | | |
|---|---|---|---|
| 2016/0125348 A1 | 5/2016 | Dyer et al. | |
| 2017/0023509 A1 | 1/2017 | Kim et al. | |
| 2017/0126143 A1 | 5/2017 | White | |
| 2017/0222964 A1 | 8/2017 | Hoffman et al. | |
| 2018/0358009 A1* | 12/2018 | Daley | G06F 3/167 |
| 2021/0288451 A1* | 9/2021 | Trenbath | H01R 13/6691 |

FOREIGN PATENT DOCUMENTS

| | | |
|---|---|---|
| CN | 204425017 U | 6/2015 |
| CN | 105186225 A | 12/2015 |
| CN | 206574958 U | 10/2017 |
| CN | 107528372 A | 12/2017 |
| CN | 109644145 A | 4/2019 |

* cited by examiner

POWER ADAPTER

CROSS-REFERENCES TO RELATED APPLICATIONS

This application is a continuation-in-part application of the U.S. patent application Ser. No. 16/935,235 filed Jul. 22, 2020; the disclosures of which are incorporated herein by reference in its entirety.

FIELD OF THE INVENTION

The present invention relates to a power adapter with built-in location tracking, data collection and wireless communication functions.

BACKGROUND

There is a substantial need for tracking the location of important devices or equipment deployed in various environments. For example, the status of life-sustaining or life-supporting medical devices must be tracked continuously to ensure that they can be promptly located the moment failure occurs to avoid serious consequences, and tracking high-value assets is beneficial to prevent theft or loss.

Furthermore, with the evolution of Internet of Things (IoT) technologies, ascertaining the locations of devices and their operational/environmental condition is also becoming increasingly important. Extending such connectivity to existing non-internet-enabled appliances without significant infrastructure modifications would be highly advantageous.

Various solutions have been developed for tracking an item's location. Satellite tracking systems, such as the Global Positioning System (GPS), are the most popular method to provide location details. For example, U.S. Pat. No. 9,503,846B2 discloses certain embedded location tracking systems for tracking sports equipment by retrofitting GPS tags in the equipment of interest. However, such tracking systems can suffer from a range of drawbacks, such as extensive maintenance requirements to recharge or replace batteries, and inaccuracy of GPS location information when the tracker is in an indoor environment such as factories, shopping malls, and hospitals.

SUMMARY OF THE INVENTION

In accordance with one aspect of the present invention, a power adapter for determining a location of the power adapter is provided; wherein the power adapter may or may not be engaged with an AC power output wall socket of a power source. The power adapter includes a power input plug configured to engage with an AC power output wall socket of a power source; a power output socket configured to engage with a power input plug of a tracked electronic device or equipment; a communication circuit module, configured to establish a network connection to a remote control center; a tag reader, configured to detect and receive a tag signal containing at least a wall socket identification (ID) from a tag circuit of an AC power output wall socket; a beacon circuit module, configured to wirelessly broadcast a beacon signal corresponding to the power adapter and to wirelessly receive a further beacon signal corresponding to a further power adapter. The power adapter further includes a processor, configured to execute machine instructions implementing a method of providing location beacons. In one embodiment, the method includes determining, by the processor, whether the power input plug is engaged with an AC power output wall socket of a power source through the detection of presence of a tag signal from a tag circuit of an AC power output wall socket. In another embodiment, the determination of whether the power input plug is engaged with an AC power output wall socket of a power source is by a detection by the power adapter of a presence of a voltage from the AC power output wall socket.

If the power input plug is not engaged with the AC power output wall socket and no tag signal is detected, the method further includes instructing, by the processor, the beacon circuit module to broadcast a beacon signal, which includes at least the power adapter ID.

If the power input plug is engaged with the AC power output wall socket (a tag signal is detected), the method further includes enabling, by the processor, the tag reader to receive the tag signal from the tag circuit of the AC power output wall socket; extracting, by the processor, a socket ID from the received tag signal. The method further includes instructing, by the processor, the beacon circuit module to receive any further beacon signal of any further power adapter. If one or more further beacon signals are received, extracting, by the processor, from each of the received the further beacon signals, a further power adapter ID. Lastly, the method further includes instructing, by the processor, the communication circuit module to transmit to the remote control center a power adapter location data message, which contains at least the power adapter ID and the socket ID, and all of the further power adapter IDs extracted from the received further beacon signals.

In accordance with another aspect of the present invention, a remote control center implemented by a computer device, such as an electronic kiosk, a mobile phone, a tablet computer, a personal computer, or a server computer having at least one computer processor, configured to execute machine instructions implementing a method of locating plugged and unplugged power adaptors; and a non-transient memory circuit module, configured to store a location mapping table containing mapping data between socket IDs and physical locations of the corresponding AC power output wall sockets. The method includes receiving, by the remote control center's processor, one or more power adapter location data messages; and extracting, by the remote control center's processor, from each of the received power adapter location data messages a power adaptor ID, a socket ID, and further power adaptor ID, if any.

The method further includes determining, by the remote control center's processor, a physical location of a power adapter corresponding to the extracted power adaptor ID by matching the extracted socket ID to a physical location of the corresponding AC power output wall socket in the location mapping table, wherein the physical location of the power adapter corresponding to the extracted power adaptor ID is the matched physical location of the corresponding AC power output wall socket.

If the received power adapter location data message contains at least one further power adaptor ID, the method further includes estimating, by the remote control center's the processor, the physical location of each further power adaptor corresponding to each of the extracted further power adaptor IDs, wherein the estimated physical location of each of the further power adaptors is within a beacon signal detection area centered around the determined physical location of the power adapter corresponding to the extracted power adaptor ID.

In one embodiment, the method further includes preserving each of the extracted further power adaptor IDs along with the extracted socket ID as a first socket ID. Should, within a pre-defined period of time, one of the preserved extracted further power adaptor IDs appear in another power adapter location data message received by the remote control center and that the other power adapter location data message contains a new (second) socket ID different from the first socket ID, the method further includes estimating, by the remote control center's processor, a new physical location of the further power adapter using a first physical location of an AC power output wall socket corresponding to the first socket ID and a second physical location of an AC power output wall socket corresponding to the second socket ID. Otherwise, should, outside of the pre-defined period of time, one of the preserved extracted further power adaptor IDs appear in another power adapter location data message received by the remote control center and that the another power adapter location data message contains a new (second) socket ID different from the first socket ID, the method further includes updating, by the remote control center's processor, a new physical location of the further power adapter with a physical location of an AC power output wall socket corresponding to the second socket ID.

In one embodiment, the estimation is done by triangulations from the first and second physical locations. In other embodiments, without limitation, the estimation may include a table lookup in a pre-defined table of matching physical locations of AC power output wall sockets and corresponding proximate locations or areas stored in the non-transient memory circuit module.

To more clearly illustrate the inventive concepts of the embodiments of the present invention, a power adapter that is engaged with an AC power output wall socket is referred to as an "anchor" beacon; and a power adapter that is not engaged with an AC power output wall socket is referred to as a "floating" beacon. While an anchor beacon's location can be ascertained from the socket ID of the AC power output wall socket, a floating beacon's location cannot. However, the floating beacon's location can be estimated from one or more anchor beacons' locations that the floating beacon is closed to (closed enough for the anchor beacon(s) to receive the beacon signal broadcasted by the floating beacon).

With the anchor beacons' locations and floating beacons' locations available in real-time, their corresponding tracked electronic device or electrical equipment can be tracked in real-time.

In one embodiment, the remote control center's processor is further configured to record the extracted information from each of the received power adaptor location data messages along with a timestamp indicating the time of receipt as historical record data in a database. With this historical record data, the changes in location (or movement) of each of the power adapters, plugged and unplugged, (and in turn the tracked electronic device or electrical equipment) can be traced.

BRIEF DESCRIPTION OF THE DRAWINGS

Embodiments of the invention are described in more detail hereinafter with reference to the drawings, in which.

DETAILED DESCRIPTION

Figure 1:
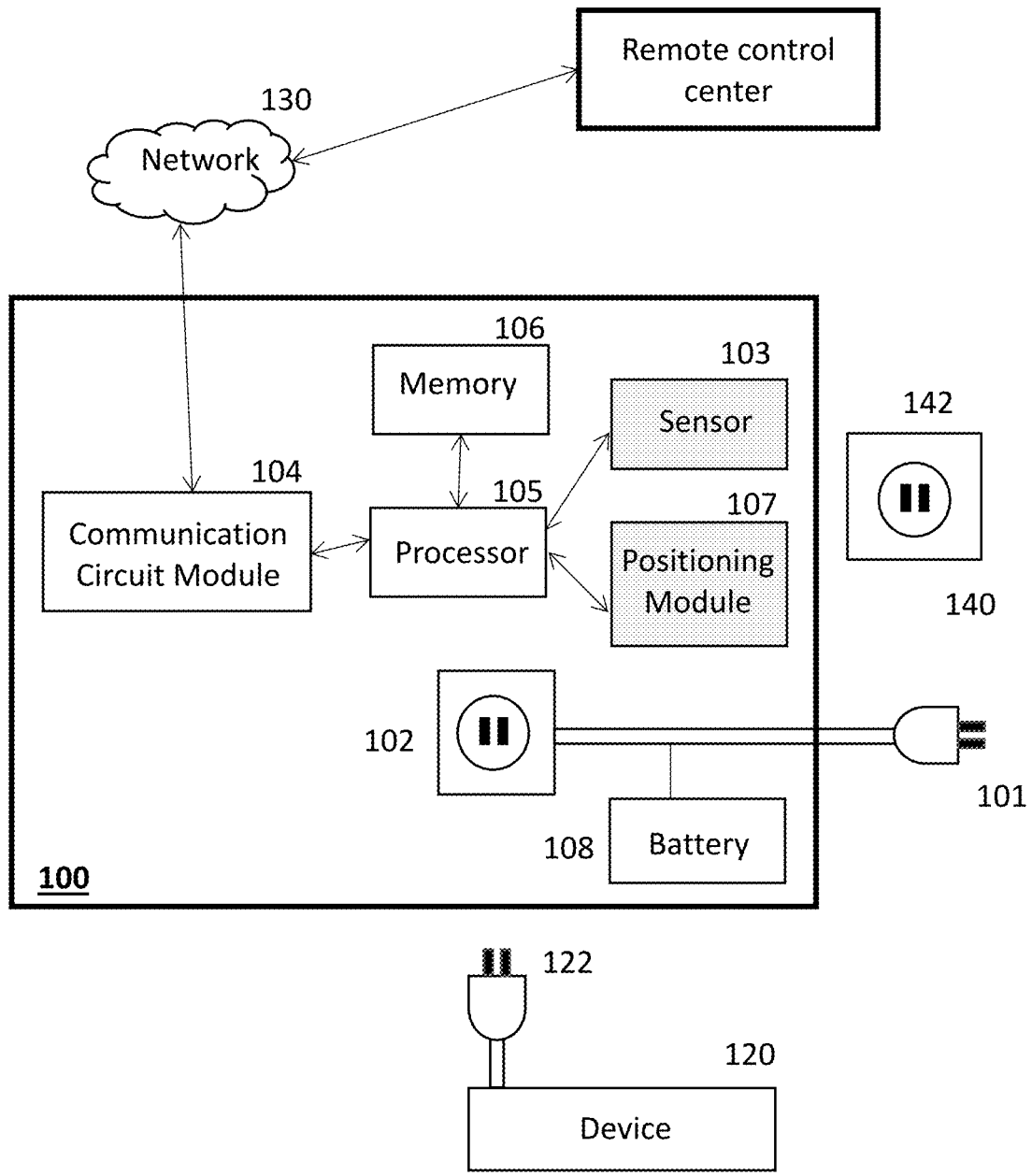
FIG. 1 depicts a block diagram of a power adapter according to the present invention.

It is to be understood that the power adapters and related systems are not limited in its application to the details of construction and the arrangement of components set forth in the following description or illustrated in the drawings. The embodiments were chosen and described in order to best explain the principles of the invention and its practical application, thereby enable others skilled in the art to understand the invention for various embodiments and with various modifications that are suited to the particular use contemplated. Also, it is to be understood that the phraseology and terminology used herein is for the purpose of description and should not be regarded as limited. The use of "including", "comprising" or "having" and variations thereof herein is meant to encompass the items listed thereafter and equivalents thereof as well as additional items. Unless limited otherwise, the terms "connected", "coupled" and variations thereof are used broadly and encompass direct and indirect connections, couplings, and mountings. In addition, the terms "connected" and "coupled" and variations thereof are not restricted to physical or mechanical connections or couplings. The words "outlet" and "receptacle" are used interchangeably in this disclosure.

FIG. 1 depicts a block diagram of a power adapter 100 according to the present invention. The power adapter 100 may be a standard AC power adapter or a DC power adapter to be used with a device 120. It should be appreciated that the device 120 may be any types of equipment including, but not limited to computers, home appliances, industrial equipment, laboratory equipment, medical equipment. The power adapter 100 may comprise a casing, a power input plug 101, a power output socket 102. The power output socket 102 may be configured to engage with a power input plug 122 of the device 120. The power input plug 101 may be configured to engage with a power output socket 142 of a power source 140, which may be, for example, a municipal utility power supply source.

The power adapter 100 may further comprise a positioning module 107 configured to detect and receive one or more location tracking signals; a processor 105 configured to process the location tracking signals to determine a location of the device 120.

The power adapter 100 may further comprise a sensor module 103 configured to measure operational/environmental parameters and feed the measured operational/environmental parameters to the processor 105. The processer 105 may be further configured to process the measured operational/environmental parameters to compute one or more operational/environmental data of the device 120.

The power adapter 100 may further comprise a communication circuit module 104 connected to a remote control center via a network 130. The processor 105 may be further configured to transmit the determined location and computed operational/environmental data to the communication circuit module 104 for exchanging data and commands with the remote control center.

Alternatively, the communication circuit module 104 may also be configured to detect and receive one or more location tracking signals and feed the detected and received location tracking signals to the processor 105.

Optionally, the power adapter may further comprise a memory module 106; and the processor 105 may be further configured to transmit the computed location and operational/environmental data to the memory module 106 for temporary storage.

The power adapter 100 may further comprise a rechargeable battery 108 which is recharged whenever the power adapter is connected to a power source and configured to provide power for continued operation of equipment when the power adapter is not in connection with a power source, for example, during transportation.

The location tracking signals to be detected by the positioning module 107 or communication circuit module 104 may include, but not limited to, GPS signals, Wi-Fi signals, RFID signals and NFC signals.

The communication circuit module 104 may be configured to communicate wirelessly via protocols of various technology standards, including but not limited to cellular, Wi-Fi, Bluetooth and NB-IoT.

The operational/environmental data measured by the sensor module 103 may include, but not limited to, electric current usage, temperature, humidity, illuminance, air quality, altitude, infrared radiation, ultraviolet radiation, and nuclear radiation.

Figure 2:
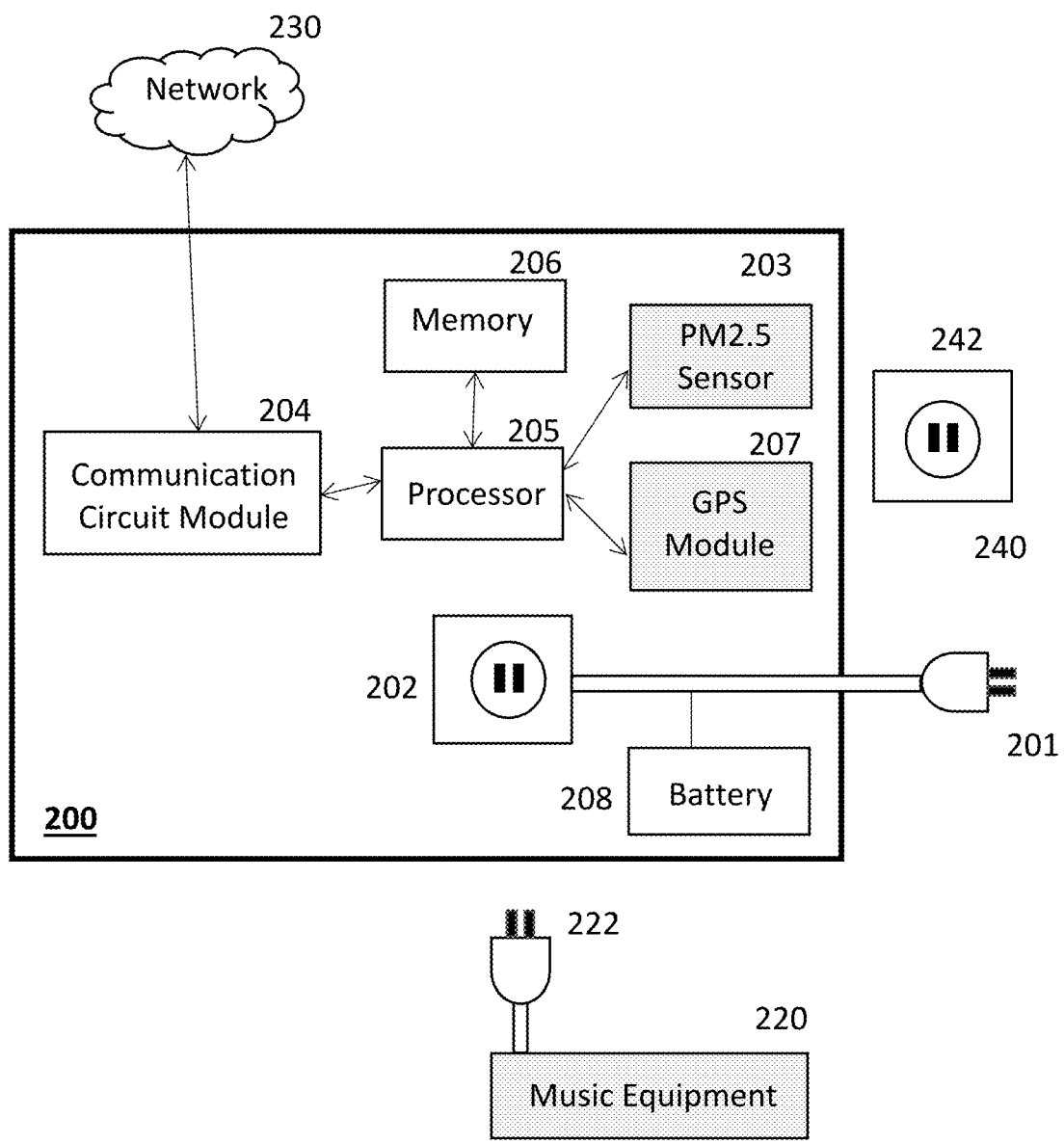
FIG. 2 depicts a power adapter to be used with a music equipment according to one embodiment of the present invention.

FIG. 2 depicts a power adapter 200 according to one embodiment of the present invention. The power adapter 200 may be used with a device 220 which is a music equipment in this illustrative example. The power adapter 200 may comprise a casing, a power input plug 201, a power output socket 202. The power output socket 202 may be configured to engage with a power input plug 222 of the music equipment 220. The power input plug 201 may be configured to engage with a power output socket 242 of a power source 240.

The power adapter 200 may further comprise a PM2.5 sensor module 203 for measuring the air quality of the working environment of the music equipment 220; a GPS module 207 for tracking location of the music equipment 220; a processor 205 for computing the location and the air quality of the working environment of the music equipment 220; a communication circuit module 204 for exchanging data and commands with a remote center via a network 230; a memory 206 for temporarily storing the computed location and air quality data; and a rechargeable battery 208.

The PM2.5 sensor module 203 may be configured to radiate suspending particles in the air in proximity of the music equipment 220 with a laser light, measure the laser scattering change with time, and feed the measured values to the processor 205 to compute the PM2.5 dust concentrations in proximity of the music equipment 220.

The GPS module 207 may be configured to receive GPS signals from GPS satellites and feed the received GPS signals to the processor 205. The processor 205 may be further configured to utilize at least one of triangulation and trilateration based on the received GPS signals to determine the location of the music equipment 220.

Figure 3:
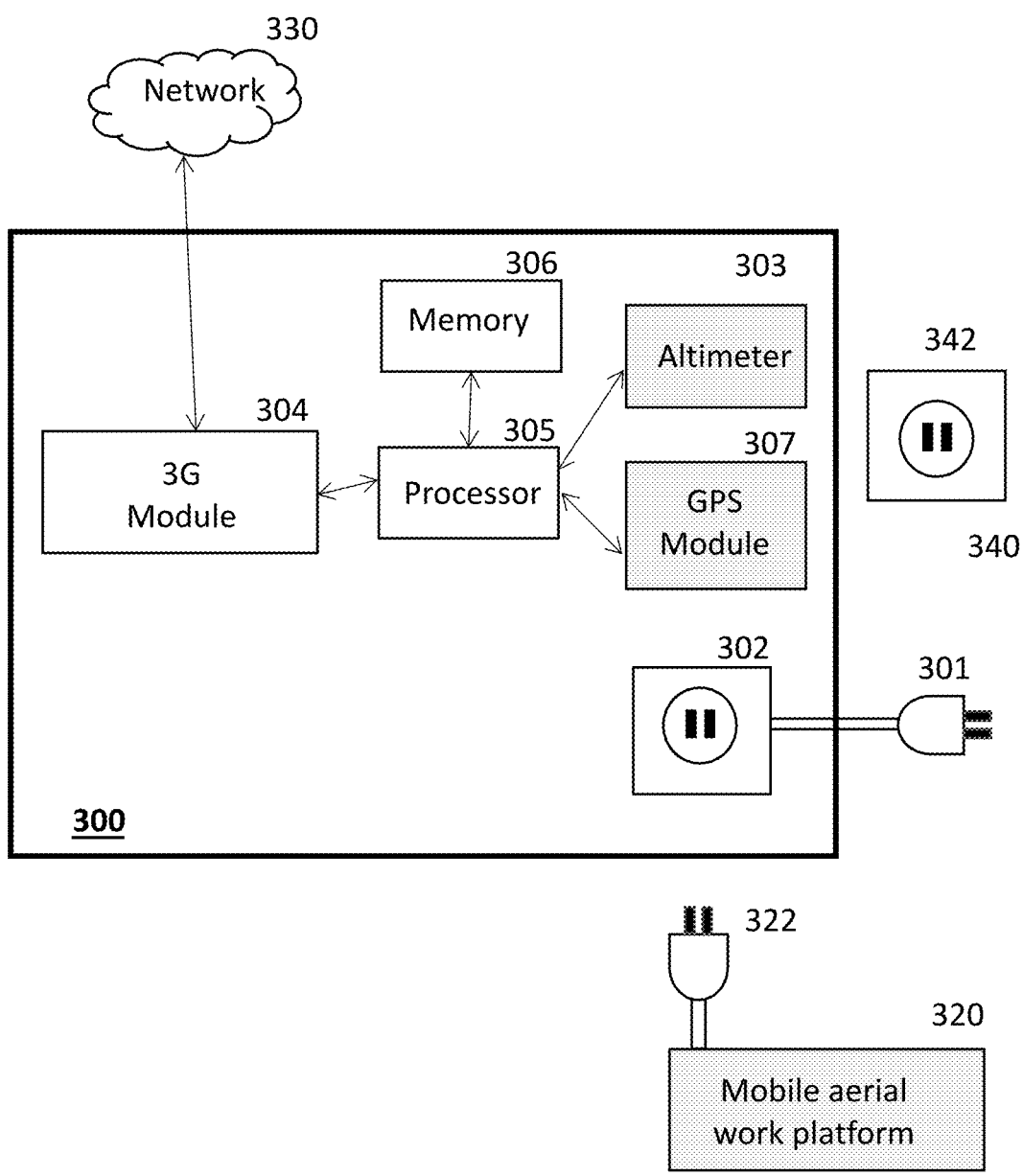
FIG. 3 depicts a power adapter to be used with a mobile aerial work platform according to one embodiment of the present invention.

FIG. 3 depicts a power adapter 300 according to another embodiment of the present invention. The power adapter 300 may be used with a device 320 which is a mobile aerial work platform in this illustrative example. The power adapter 300 may comprise a casing, a power input plug 301, a power output socket 302. The power output socket 302 may be configured to engage with a power input plug 322 of the mobile aerial work platform 320. The power input plug 301 may be configured to engage with a power output socket 342 of a power source 340.

The power adapter 300 may further comprise an altimeter 303 for measuring the altitude of the mobile aerial work platform 320; a GPS module 307 for tracking location of the mobile aerial work platform 320; a processor 305 for computing the location and the altitude of the mobile aerial work platform 320; a communication circuit module 304 for exchanging data and commands with a remote center via a network 330; and a memory 306 for temporarily storing the computed location and altitude data.

The altimeter 303 may be configured for measuring the atmospheric pressure and feed the measured atmospheric pressure value to the processor 305 to compute the altitude of the mobile aerial work platform 320.

The GPS module 307 may be configured to receive GPS signals from GPS satellites and feed the received GPS signals to the processor 305. The processor 305 may be further configured to utilize at least one of triangulation and trilateration based on the received GPS signals to determine the location of the mobile aerial work platform 320.

Figure 4:
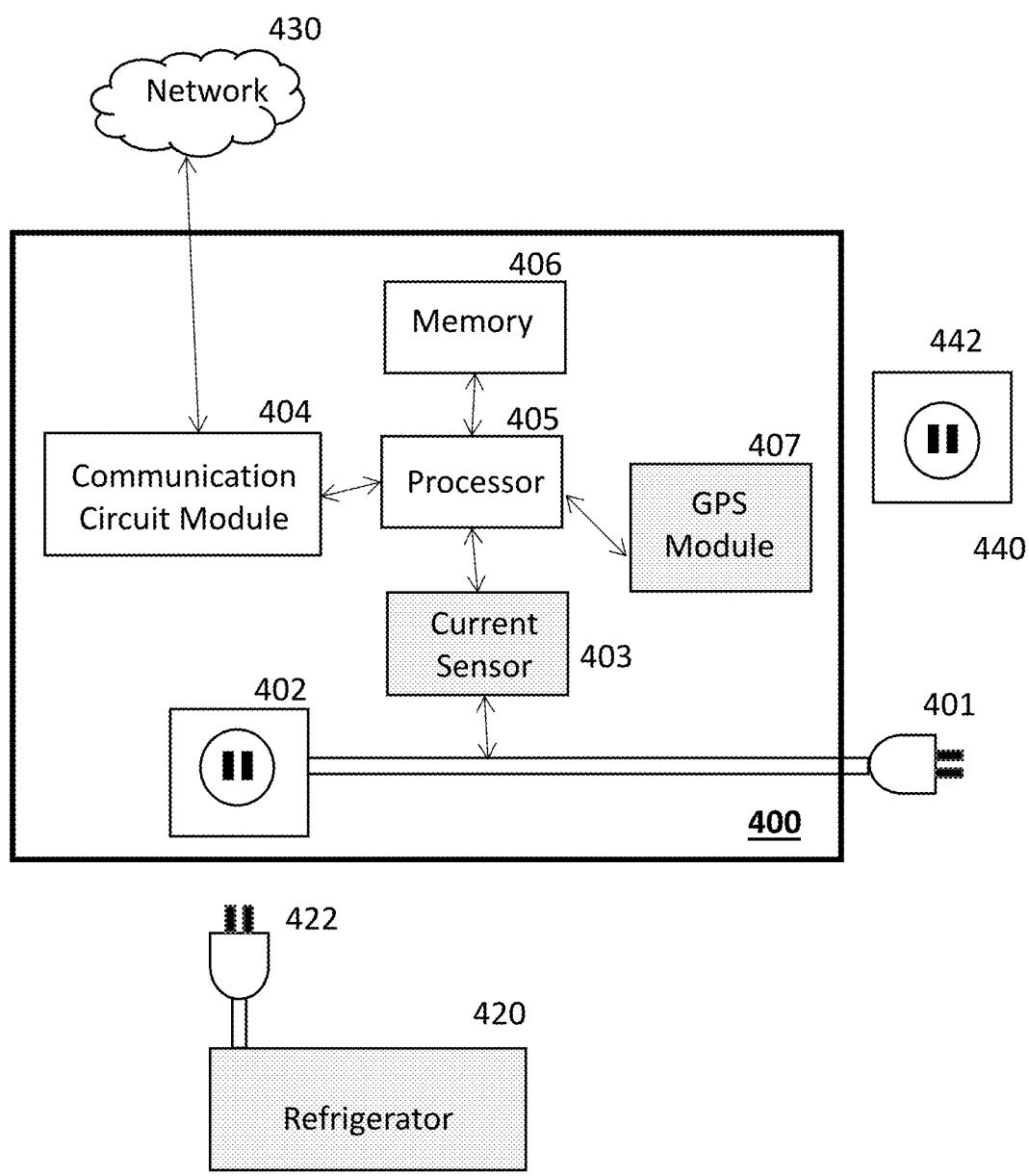
FIG. 4 depicts a power adapter to be used with a refrigerator according to one embodiment of the present invention.

FIG. 4 depicts a power adapter 400 according to another embodiment of the present invention. The power adapter 400 may be used with a device 420 which is a refrigerator in this illustrative example. The power adapter 400 may comprise a casing, a power input plug 401, a power output socket 402. The power output socket 402 may be configured to engage with a power input plug 422 of the refrigerator 420. The power input plug 401 may be configured to engage with a power output socket 442 of a power source 440.

The power adapter 400 may further comprise a current sensor 403 coupled to the power output socket 402; a GPS module 407 for tracking location of the refrigerator 420; a processor 405 for computing the location and the current usage of the refrigerator 420; a communication circuit module 404 for exchanging data and commands with a remote center via a network 430; and a memory 406 for temporarily storing the computed location and current usage data.

The current sensor 403 may be configured for measuring the current at the output power socket 402 and feed the measured value to the processor 405 to compute the current usage of the refrigerator 420.

The GPS module 407 may be configured to receive GPS signals from GPS satellites and feed the received GPS signals to the processor 405. The processor 405 may be further configured to utilize at least one of triangulation and trilateration based on the received GPS signals to determine the location of the refrigerator 420.

Figure 5:
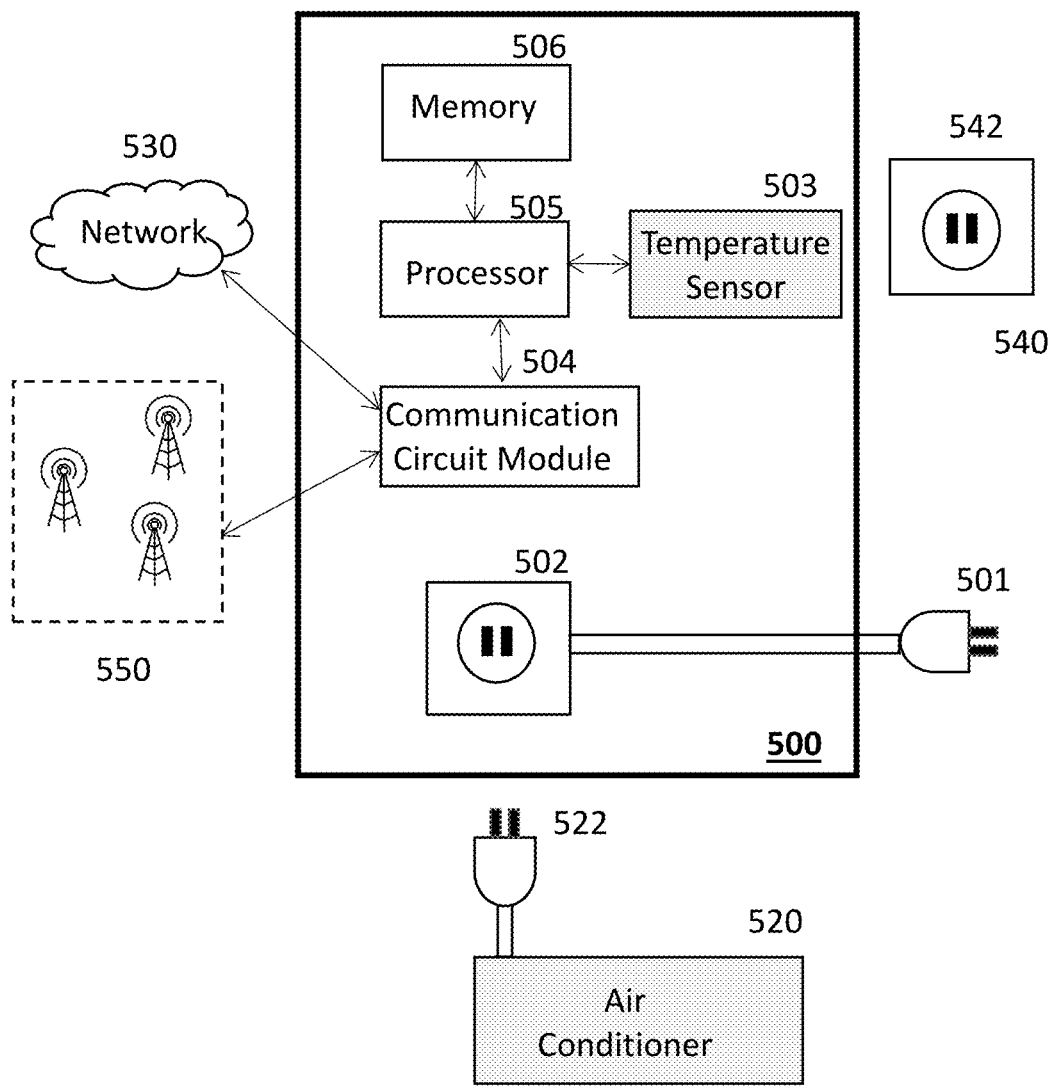
FIG. 5 depicts a power adapter to be used with an air conditioner according to one embodiment of the present invention.

FIG. 5 depicts a power adapter 500 according to another embodiment of the present invention. The power adapter 500 may be used with a device 520 which is an air conditioner in this illustrative example. The power adapter 500 may comprise a casing, a power input plug 501, a power output socket 502. The power output socket 502 may be configured to engage with a power input plug 522 of the air conditioner 520. The power input plug 501 may be configured to engage with a power output socket 542 of a power source 540.

The power adapter 500 may further comprise a temperature sensor 503 for measuring the working temperature of the air conditioner 520; a communication circuit module 504 for tracking location and exchanging data and commands with a remote center via a network 530; a processor 505 for computing the location and the working temperature of the air conditioner 520; and a memory 506 for temporarily storing the computed location and working temperature data.

The communication circuit module 504 may be configured to receive access point data, including but not limit to Received Signal Strength Indicator (RSSI) value, Service Set Identifier (SSID) and Media Access Control (MAC) address from a plurality of access points 550 in range and feed the access point data to the processor 505. The processor 505 may be configured to compare the received access point data to a fingerprint database of access points with known locations to return a closest matched result to determine the location of the air conditioner 520.

The temperature sensor 503 may be one of, but not limited to, thermal couple, thermistor and semiconductor-based temperature sensors, configured to measure temperature change and feed the measured value to the processor 505 to compute the working temperature of the air conditioner 520.

In accordance with other embodiments of the present invention, the power adapter may include one or more of motion sensor, light sensor, acoustic sensor, sound meter, and moisture/water detector for various domestic, commercial, and industrial applications such as in premises security monitoring, live event hosting and management, laboratory and medical facility monitoring. An ordinarily skilled person in the art should appreciate that sensors of different functionalities and configurations can be incorporated in the power adapter without deviating from the spirit of the present invention and undue experimentation.

Figure 6:
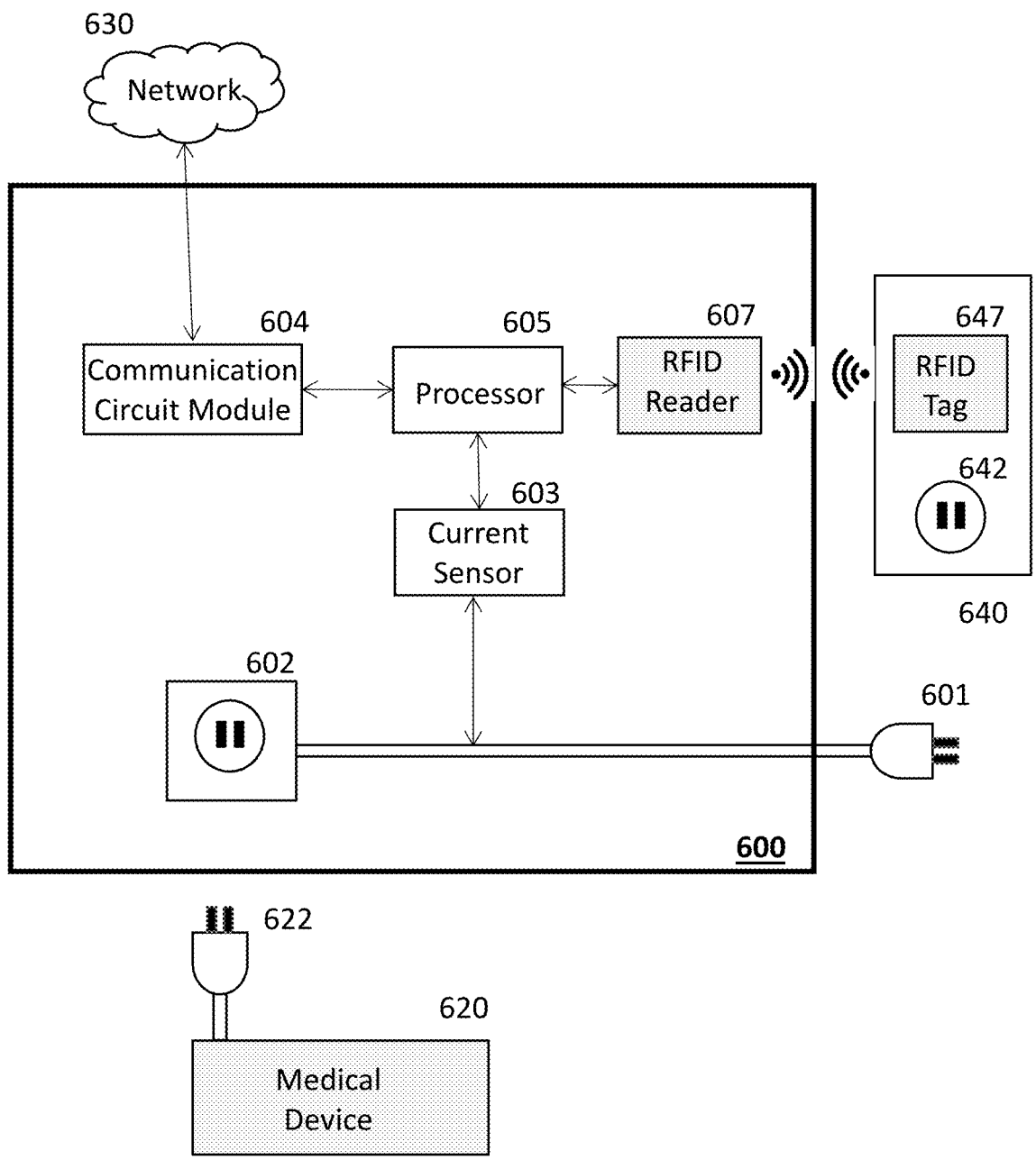
FIG. 6 depicts a power adapter to be used with a medical device according to one embodiment of the present invention.

FIG. 6 depicts a power adapter 600 according to another embodiment of the present invention. The power adapter 600 may be used with a device 620 which is a medical device in this illustrative example. The power adapter 600 may comprise a casing, a power input plug 601, a power output socket 602. The power output socket 602 may be configured to engage with a power input plug 622 of the medical device 620. The power input plug 601 may be configured to engage with a power output socket 642 of a power source 640.

The power adapter 600 may further comprise a current sensor 603 connected to the power output socket 602; a RFID reader 607; a processor 605 for computing the location and monitoring the operation status of the medical device 620; a communication circuit module 604 for exchanging data and commands with a remote center via a network 630; and a memory 606 for temporarily storing the computed location and operation status data.

The RFID reader 607 may be configured to detect an identification number from a RFID tag 647 installed in the power source 640 and feed the identification number to the processor 605. The processor 605 may be configured to compare the received identification number to a database of identification numbers with known locations to return a closest matched result to determine the location of the medical device 620.

Optionally, the communication circuit module 604 may be configured to receive access point data, including but not limit to Received Signal Strength Indicator (RSSI) value, Service Set Identifier (SSID) and Media Access Control (MAC) address from a plurality of access points 650 in range and feed the access point data to the processor 605. The processor 605 may be configured to compare the received access point data to a fingerprint database of access points with known locations to return a closest matched result to determine the location of the medical device 620.

The current sensor 603 may be configured for measuring the current at the output power socket 602 and feed the measured current value to the processor 605 to monitor the operation status of the medical device 620.

Figure 7:
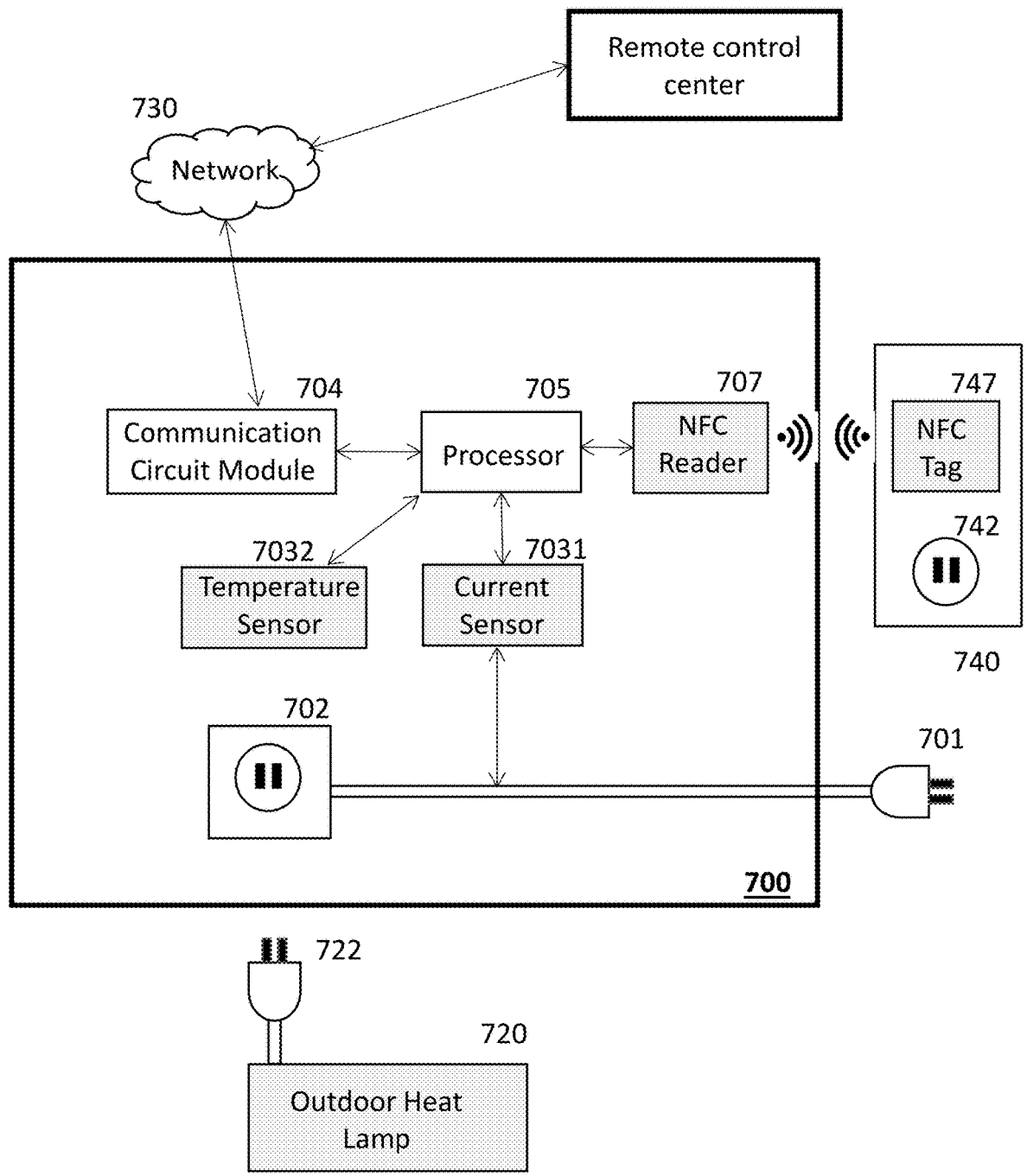
FIG. 7 depicts a power adapter to be used with an outdoor heat lamp according to one embodiment of the present invention.

FIG. 7 depicts a power adapter 700 according to another embodiment of the present invention. The power adapter 700 may be used with a device 720 which is an outdoor heat lamp in this illustrative example. The power adapter 700 may comprise a casing, a power input plug 701, a power output socket 702. The power output socket 702 may be configured to engage with a power input plug 722 of the outdoor heat lamp 720. The power input plug 701 may be configured to engage with a power output socket 742 of a power source 740.

The power adapter 700 may further comprise a current sensor 7031 connected to the power output socket 702; a temperature sensor 7032; an NFC reader 707; a processor 705 for computing the location and monitoring the operation status of the outdoor heat lamp 720; a communication circuit module 704 for exchanging data and commands with a remote center via a network 730; and a memory 706 for temporarily storing the computed location and operation status data.

The NFC reader 707 may be configured to detect an identification number from an NFC tag 747 installed in the power source 740 and feed the identification number to the processor 705. The processor 705 may be configured to compare the received identification number to a database of identification numbers with known locations to return a closest matched result to determine the location of the outdoor heat lamp 720.

Optionally, the communication circuit module 704 may be configured to receive access point data from a plurality of access points 750 in range and feed the access point data to the processor 705. The processor 705 may be configured to compare the received access point data to a fingerprint database of access points with known locations to return a closest match to determine the location of the outdoor heat lamp 720.

The current sensor 7031 may be configured for measuring the current at the output power socket 702 and feed the measured value to the processor 705 to monitor the current consumption of the outdoor heat lamp 720.

The temperature sensor 703 may be configured to measure the temperature change and feed the measured value to the processor 705 to compute the working temperature of the outdoor heat lamp 720.

Figure 8:
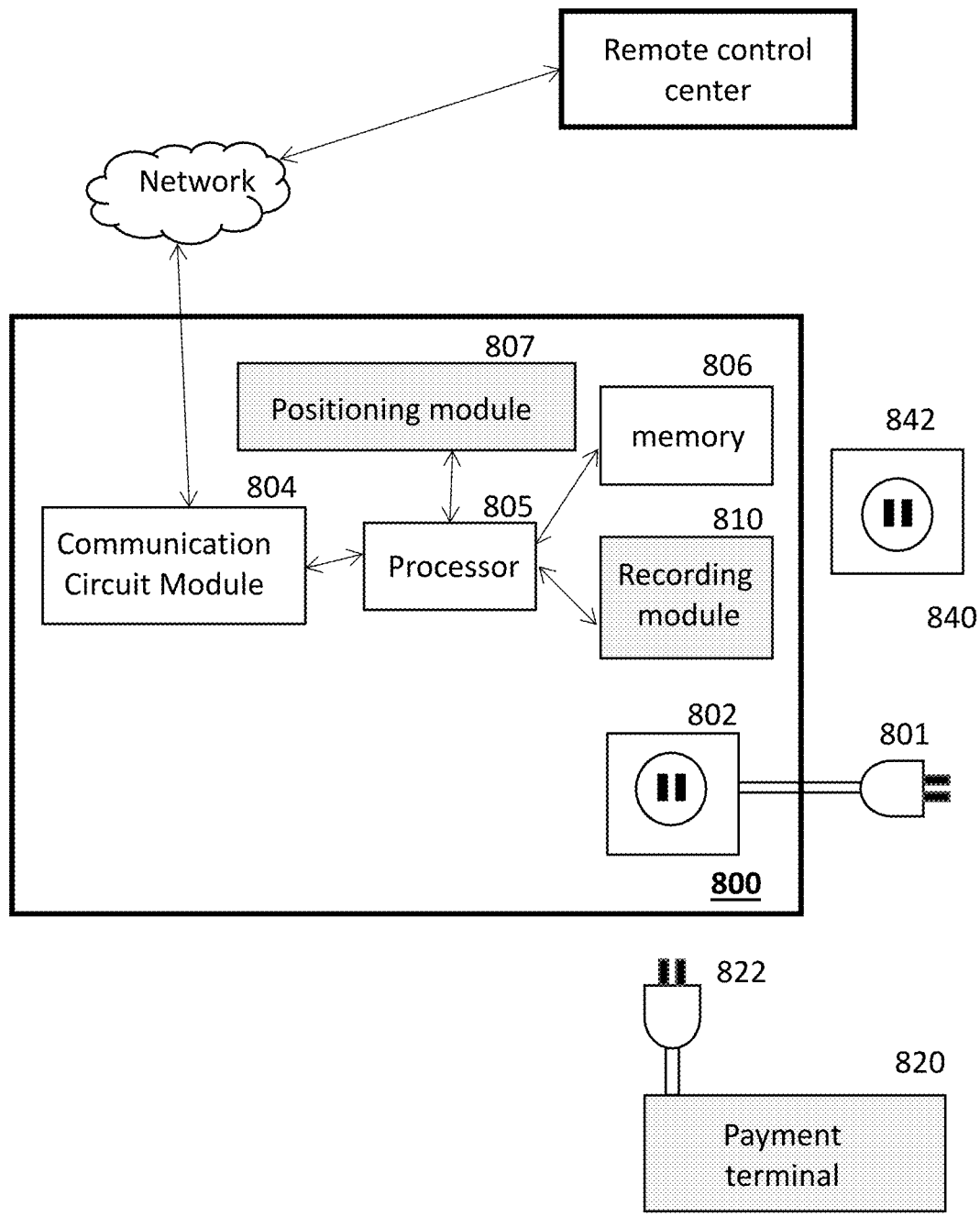
FIG. 8 depicts a power adapter to be used with a payment terminal according to one embodiment of the present invention.

FIG. 8 depicts a power adapter 800 according to another embodiment of the present invention. In this embodiment, the power adapter 800 is used with a payment terminal 820 and comprises a casing, a power input plug 801 and a power output socket 802. The power output socket 802 is configured to engage with a power input plug 822 of the payment terminal 820. The power input plug 801 is configured to engage with a power output socket 842 of a power source 840.

The payment terminal 820 is configured to provide a mean of payment transaction, which includes but not limited to a point-of-sale (POS) device and a credit card terminal.

The power adapter 800 may further comprise a recording module 810, a positioning module 807 and a processor 805. The recording module 810 is configured for recording audio, video, or both of its surrounding, and can be a microphone or a camera.

As aforementioned, the positioning module 807 may be a GPS module, communication circuit module, a RFID reader or an NFC reader, which is configured for detecting and/or receiving location tracking signals. The processor 805 may be configured to process the location tracking signals to determine a location of the device.

The power adapter 800 may further comprise a non-transient memory 806 that allows the processor 805 to store the recorded audio and video temporarily. Alternatively, the power adapter 800 may further comprise a communication circuit module 804 that is configured to exchange data and commands with a remote control center, and store the recorded audio or video to an external storage via a network.

Figure 9:
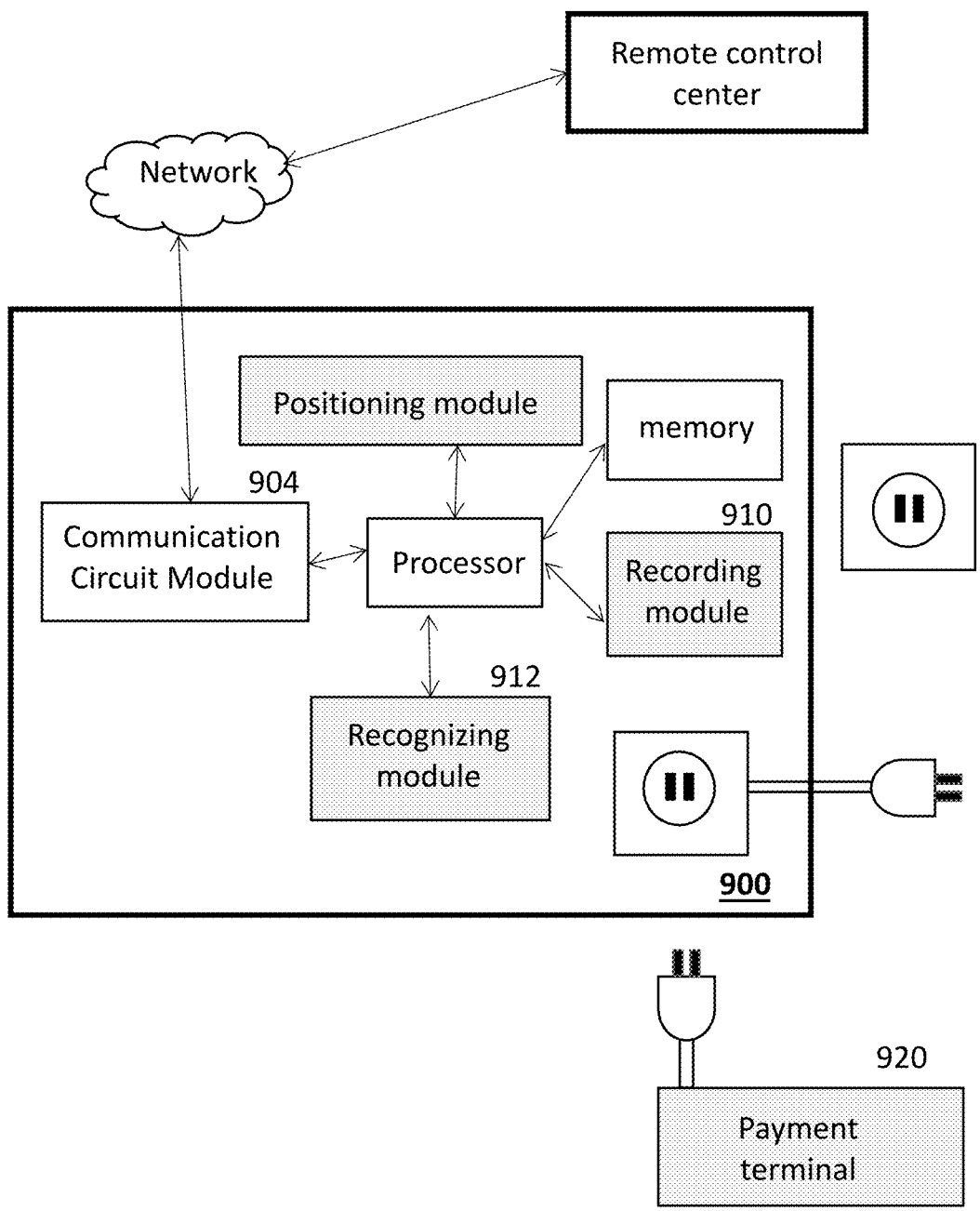
FIG. 9 depicts a power adapter to be used with a payment terminal according to another embodiment of the present invention.

FIG. 9 depicts a power adapter 900 to be used with a payment terminal 920 according to another embodiment of the present invention. In this embodiment, the power adapter 900 further comprises a recognizing module 912 configured to identify suspect from the recorded audio or video.

The recognizing module 912 may be an Automatic Speech Recognition (ASR) system that is able to recognize and transcribe spoken language into text. In one embodiment, the recognizing module 912 can be triggered by certain keywords while a recording module 910 is continuously recording the ambient audio, and convert a conversation into text. The keywords used for triggering the recognizing module 912 are predetermined and are considered to be keywords related to suspected illegal activities.

In another embodiment, the recognizing module 912 can also be a facial recognizing module configured identify suspect from the recorded video.

The power adapter 900 may further comprise a communication circuit module 904 configured to report the identified suspect to a remote control center or store the video of identified suspect to an external storage via a network.

Figure 10:
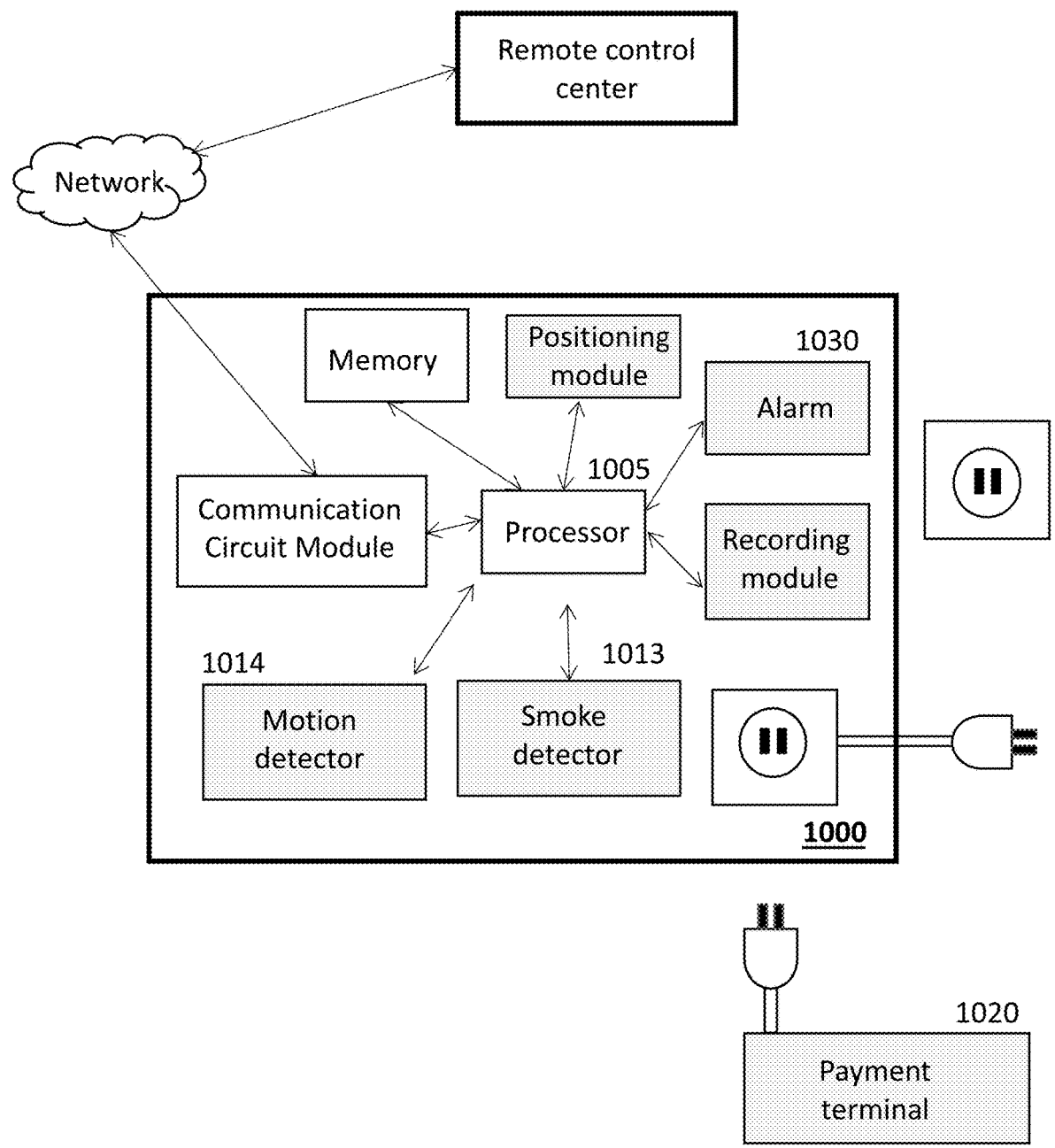
FIG. 10 depicts a power adapter to be used with a payment terminal according to yet another embodiment of the present invention.

FIG. 10 depicts a power adapter 1000 in accordance with another exemplary embodiment of the present invention. In this embodiment, in order to secure the payment terminal 1020, the power adapter 1000 may further comprise a smoke detector 1013 and a motion detector 1014 connected to a processor 1005. The smoke detector 1013 is configured to sense excessive smoke in its ambient area. The motion detector 1014 is configured to detect any movement in its detection range area.

The power adapter 1000 may further comprise an emergency alarm 1030. The emergency alarm 1030 is configured for noticing the user or transmitting notice remotely to a remote control center. For example, the emergency alarm 1030 is triggered when the smoke detector 1013 detects excessive smoke, unexpected motion detected by the motion detector 1014, a short circuit of the power adapter 1000, or a blackout.

The emergency alarm 1030 may be any format such as a buzzer, a flash light or a signal transmitter.

Figure 11A:
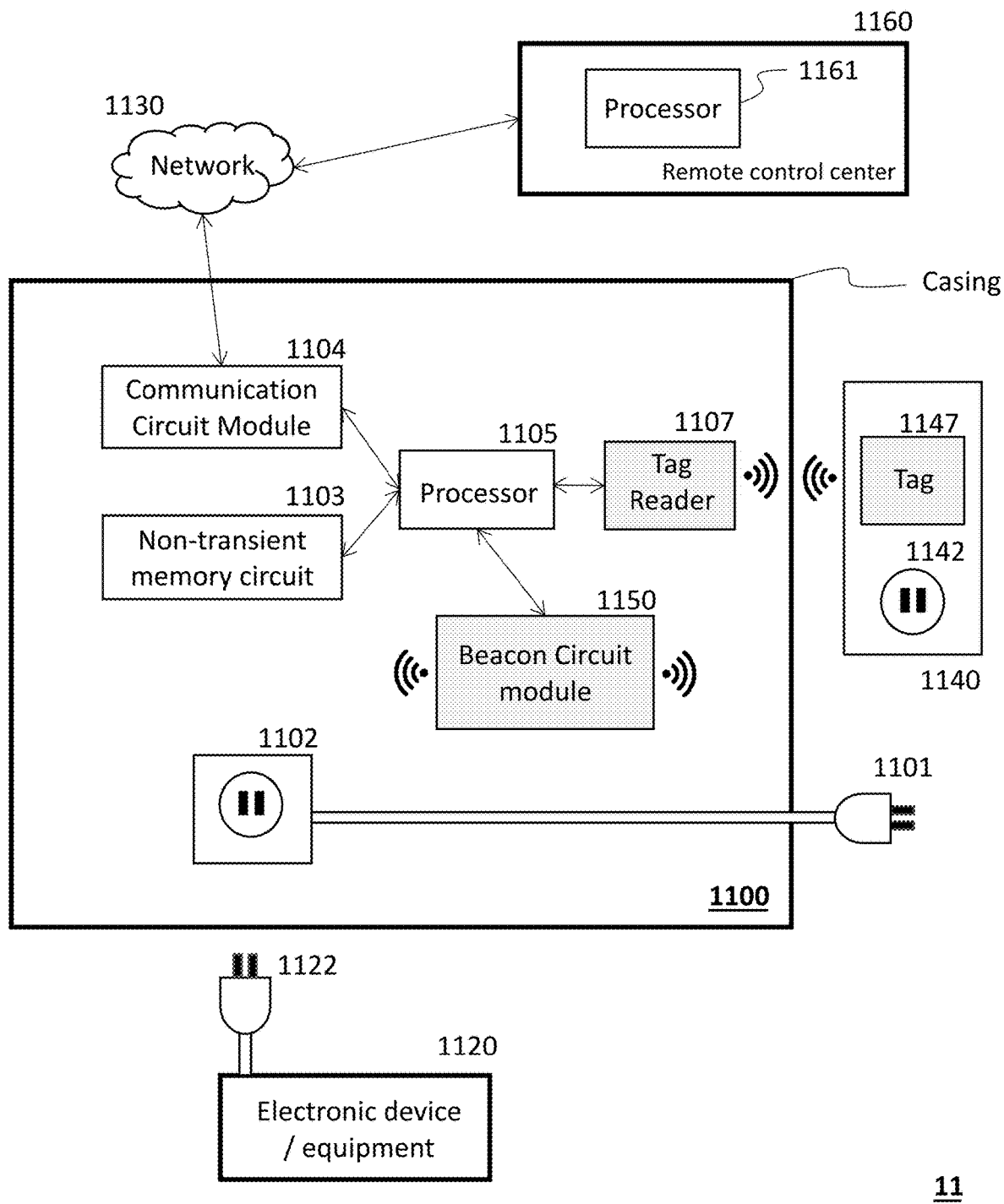
FIG. 11A depicts a block diagram of a location tracking system including a remote control center and a power adapter having a beacon circuit module according to yet another embodiment of the present invention.

Referring to FIG. 11A, the location tracking system 11 includes a remote control center 1160 and a power adapter 1100. The remote control center 1160 includes a processor and a non-transient memory circuit (not shown). The power adapter 1100 includes: a power input plug 1101; a power output socket 1102; a non-transient memory circuit 1103; a communication circuit module 1104; a tag reader 1107; a beacon circuit module 1150; and a processor 1105.

The power input plug 1101 is configured to engage with an AC power output wall socket 1142 of a power source 1140. The power output socket 1102 is configured to engage with a first power input plug 1122 of a tracked electronic device or equipment 1120. The communication circuit module 1104 is configured to establish a network connection 1130 to a remote control center 1160. The network connection 1130 may a wired or wireless network connection; and in the case of wired network connection, a separate network infrastructure (not shown in the figures) may be employed, or the AC power distribution network of the AC power output wall socket 1142 may be used for data communication.

The tag reader 1107 is configured to detect and receive a tag signal containing at least a wall socket ID from a tag circuit 1147 of an AC power output wall socket. Specifically, the tag reader 1107 and the tag circuit 1147 may be, without limitation, implemented in compliance with the NFC, RFID, or other suitable protocol.

Figure 11B:
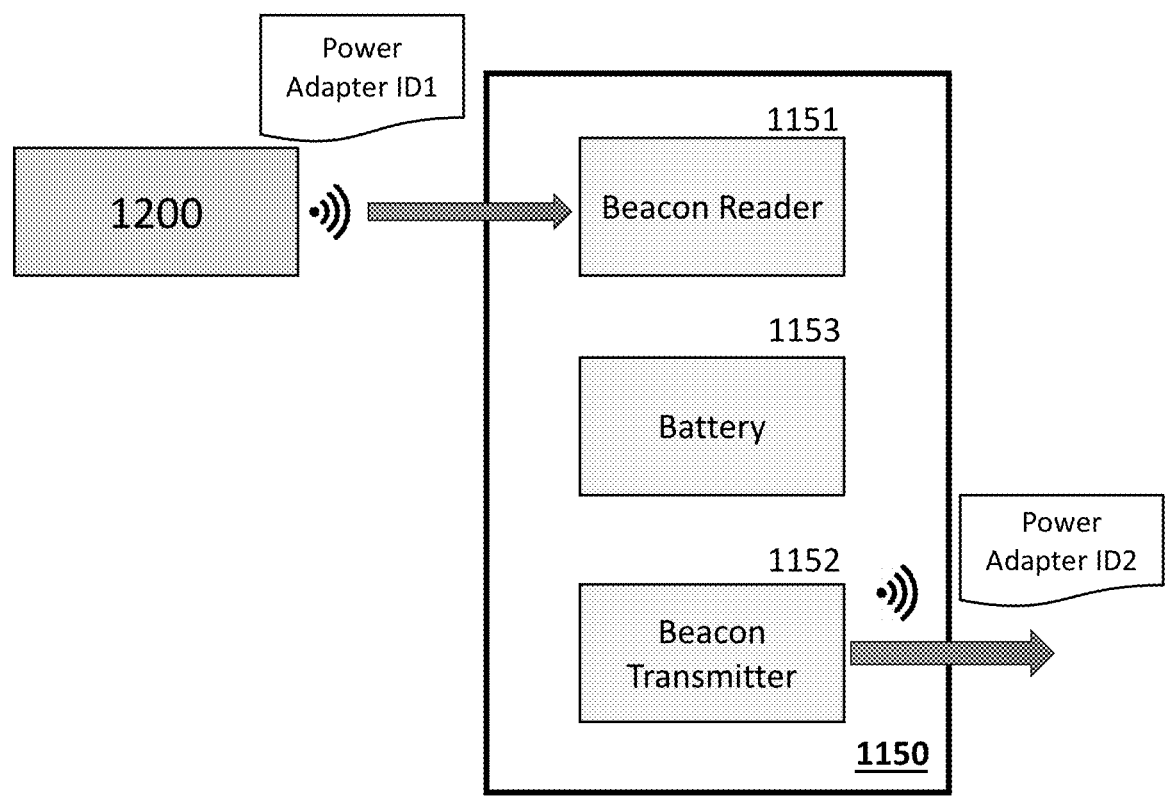
FIG. 11B depicts a block diagram of the beacon circuit module.

The beacon circuit module 1150 is configured to wirelessly broadcast a beacon signal corresponding to the power adapter and to wirelessly receive a further beacon signal corresponding to a further power adapter. More specifically, referring to FIG. 11B, the beacon circuit module 1150 includes a beacon reader 1151, a beacon transmitter 1152, and a battery 1153. The beacon reader 1151 is configured to receive a further beacon signal containing a further power adapter ID (e.g., power adapter ID1) broadcasted by a further power adapter (e.g., power adapter 1200). The beacon transmitter 1152 is configured to broadcast a beacon signal containing a power adapter ID (e.g., power adapter ID2) corresponding to the power adapter. The battery 1153 is configured to provide power to the beacon circuit module 1150, such that the beacon transmitter 1152 can broadcast the beacon signal when the power adapter is not plugged in the AC power output wall socket 1142 of the power source 1140. The beacon reader 1151 and the beacon transmitter 1152 are communication circuits which operate under a short-range wireless communication protocol, such as Bluetooth™. In another embodiment, the beacon circuit module 1150 can be integrated into the communication circuit module 1104. In one embodiment, the battery 1153 is rechargeable and is configured to be recharged when the power adapter 1150 is connected to a power source.

Figure 12A:
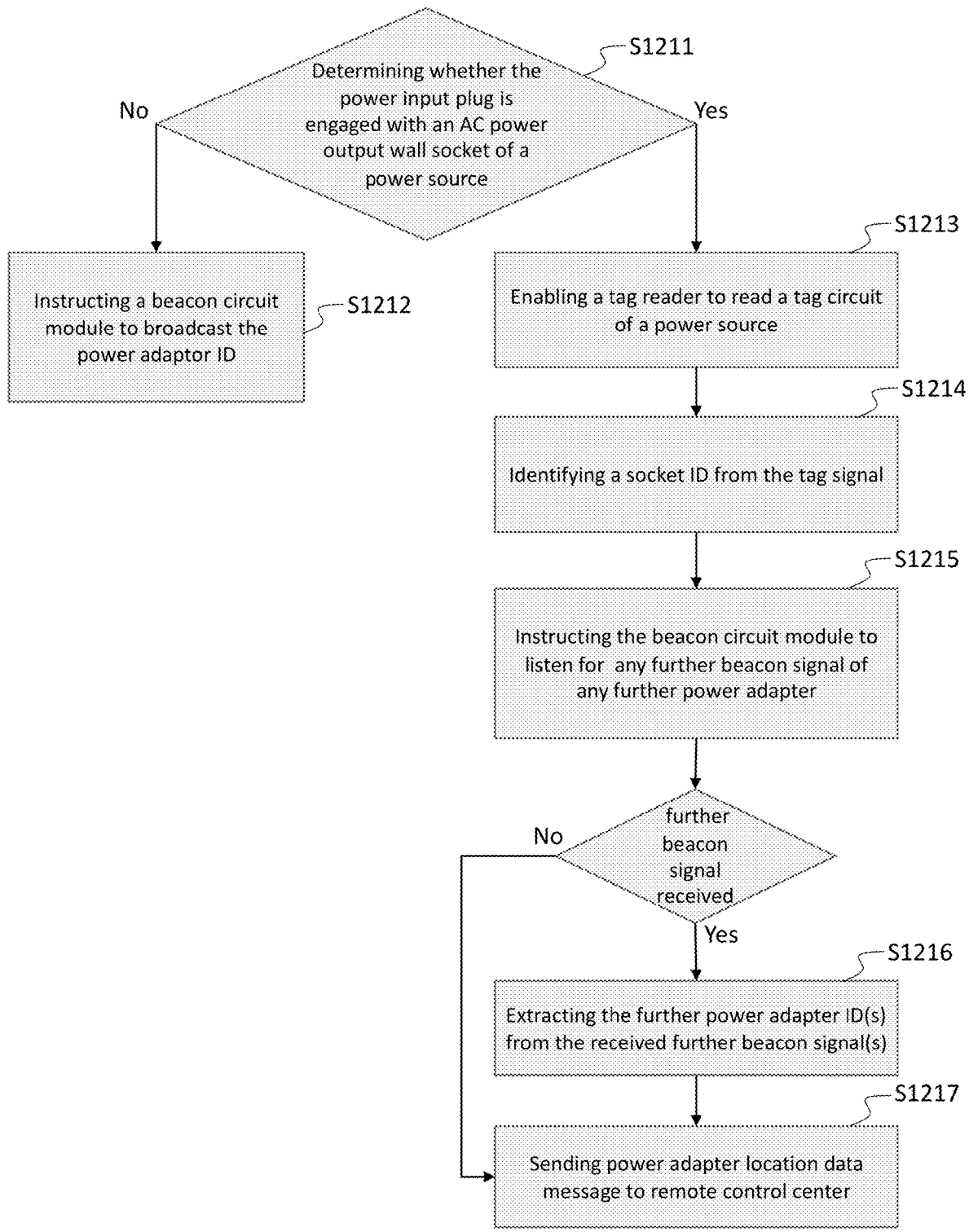
FIG. 12A and FIG. 12B depict a flowchart of the provided location tracking method.

The processor 1105 is configured to execute machine instructions implementing a method of providing location beacons. Referring to FIG. 12A, in step S1211, in one embodiment, the processor 1105 determines whether the power input plug 1101 is engaged with an AC power output wall socket 1142 of a power source 1140 by the detection of presence of a tag signal from the tag circuit of the AC power output wall socket 1142. In another embodiment, the determination of whether the power input plug 1101 is engaged with the AC power output wall socket 1142 of the power source 1140 is by a detection by the power adapter of a presence of a voltage supplied by the AC power output wall socket 1142.

If the power input plug is not engaged with an AC power output wall socket 1142 of the power source 1140 (no tag signal is detected), in step S1212, the processor 1105 instructs the beacon circuit module 1150 to broadcast a beacon signal, which includes at least the power adapter ID of the power adapter 1100. In other words, when the power adapter 1100 is changed to an unplugged status from a plugged status (e.g., engaged with an AC power output wall socket 1142 of a power source 1140), the processor 110 starts the beacon transmitter function of the power adapter 1100, so as to broadcast its own power adapter ID via the beacon transmitter of the beacon circuit module 1150, and the power adapter 1110 acts as a floating beacon.

Otherwise, if the power input plug 1101 is engaged with an AC power output wall socket 1142 of the power source 1140 (a tag signal is detected), in step S1213, the processor 1105 enables the tag reader 1107 to receive the tag signal from the tag circuit 1147 of the power source 1140.

Next, in step S1214, the processor 1105 extracts a socket ID from the detected tag signal received from the tag circuit 1147.

Next, in step S1215, the processor 1105 instructs the beacon circuit module 1150 to detect and receive any further beacon signal of any further power adapter. In other words, when the power adapter 1100 is changed to the plugged status from the unplugged status, the processor 110 starts the beacon reader function of the power adapter 1100, so as to listen for beacon signal sent from other (further) power adapter(s) via the beacon reader of the beacon circuit module 1150, and the power adapter 1110 acts as an anchor beacon.

Next, in step S1216, if one or more further beacon signals are received, the processor 1105 extracts from each of the received the further beacon signals a further power adapter ID.

Next, in step S1217, the processor 1105 generates a power adapter location data message, which contains at least the power adapter ID and the socket ID, and all of the further power adapter IDs extracted from the received further beacon signals, and instructs the communication circuit module 1104 to send the power adapter location data message to the remote control center 1160 via the network connection 1130.

Through the network 1130, the remote control center 1160 receives data messages of many different types for different purposes from the anchor beacons and floating beacons. The power adapter location data message is only one type of data message; other types include, but not limited to, various sensor reading data message such as voltage and current readings, power usages, environmental (i.e., ambient temperature) readings.

In one embodiment, the remote control center 1160 may exchange or broadcast data messages with each power adapter. For example, the remote control center 1160 may broadcast a homing command data message with a specified power adapter ID such that the power adapter of the specified power adapter ID having received the homing command data message may react by i.e., generating an audio and/or visual alarm to allow itself be located.

In one embodiment, the processor 1105 is further configured to determine whether the tracked electronic device or equipment 1120 is plugged in the power output socket 1102 and being used (e.g., by the variation of the internal current/voltage); and to include the tracked electronic device or equipment's plugged and usage state in the power adapter location data message being sent to the remote control center 1160.

Referring to FIG. 11B again, in an alternative embodiment, the beacon circuit module of the power adapter is capable of measuring a signal strength (e.g., Received Signal Strength Indication, RSSI) of a detected beacon signal. In this case, the beacon signal strength corresponding to each of the further power adapter IDs is also included in the power adapter location data message sent to the remote control center 1160 for the location estimation of each of the further power adapters.

The non-transient memory circuit of the remote control center 1160 is configured to store machine instructions to be executed by the processor of the remote control center 1160 and at least a location mapping table containing mapping data between socket IDs and physical locations of the corresponding AC power output wall sockets.

Figure 12B:
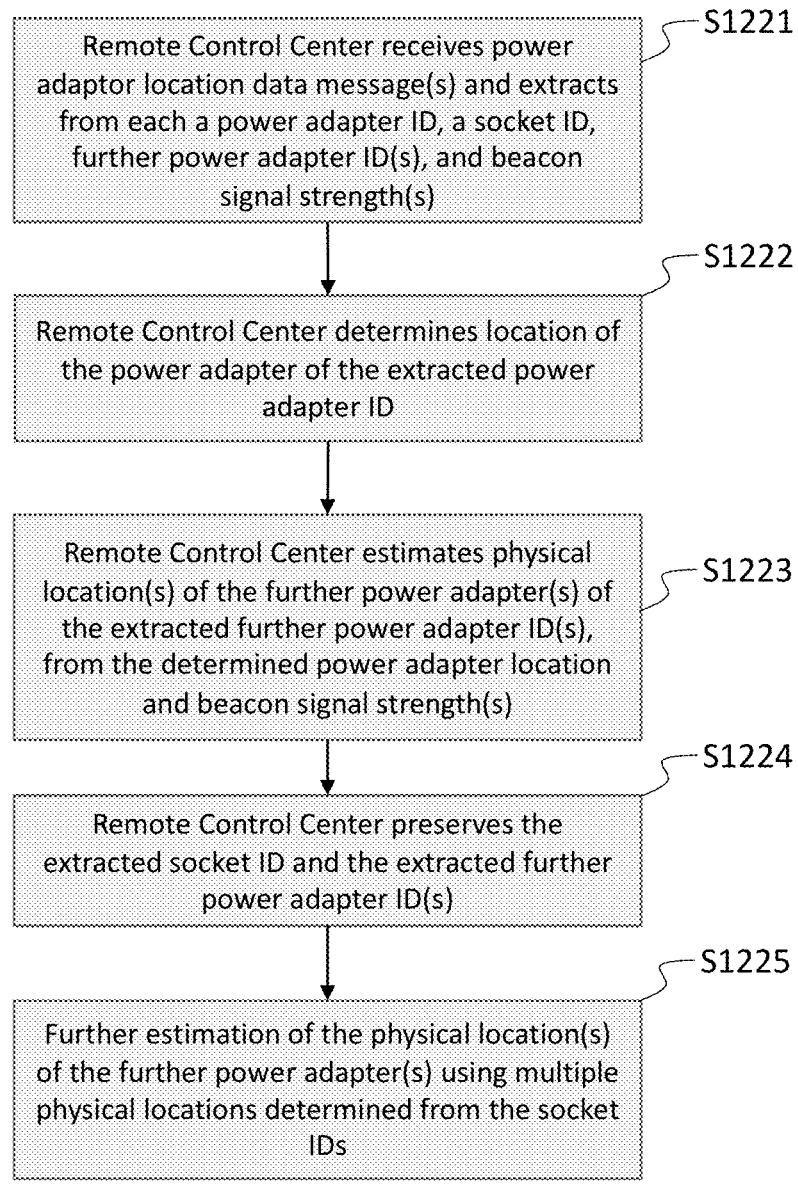

Referring to FIG. 12B for the following description. In step S1221, after the remote control center 1160 receives one or more power adapter location data messages; the processor of the remote control center 1160 extracts from each of the received power adapter location data message a power adaptor ID, a socket ID, one or more further power adaptor IDs, and one or more beacon signal strength associating with the further power adaptor IDs, if any.

In step 1222, the processor of the remote control center 1160 determines a physical location of a power adapter corresponding to the extracted power adaptor ID by matching the extracted socket ID to a physical location of the corresponding AC power output wall socket in the location mapping table, wherein the physical location of the power adapter corresponding to the extracted power adaptor ID is the matched physical location of the corresponding AC power output wall socket.

If the received power adapter location data message contains at least one further power adaptor ID, in step 1223, the processor of the remote control center 1160 estimates the physical location of each further power adaptor corresponding to each of the extracted further power adaptor IDs, wherein the estimated physical location of each of the further power adaptors is within a beacon signal detection area of a pre-determined size centered around the determined physical location of the power adapter corresponding to the extracted power adaptor ID. If there is an extracted beacon signal strength associated with the extracted further power adaptor ID, the beacon signal detection area is calculated based on extracted beacon signal strength instead of the pre-determined size.

In step 1224, the processor of the remote control center 1160 preserves each of the extracted further power adaptor IDs along with the extracted socket ID as a first socket ID in the non-transient memory circuit module of the remote control center 1160. In step 1225, a further estimation of physical location of each of the further power adaptors using multiple physical locations determined from associating socket IDs is performed and is described in more details below.

Should, within a pre-defined period of time, one of the preserved extracted further power adaptor IDs appear in another power adapter location data message received by the remote control center and that the other power adapter location data message contains a new (second) socket ID that is different from the first socket ID, the method further includes estimating, by the remote control center's processor, a new physical location of the further power adapter using the (first) physical location of the AC power output wall socket corresponding to the first socket ID and the (second) physical location of the AC power output wall socket corresponding to the second socket ID. Otherwise, should, outside of the pre-defined period of time, one of the preserved extracted further power adaptor IDs appear in another power adapter location data message received by the remote control center and that the other power adapter location data message contains a new (second) socket ID that is different from the first socket ID, the method further includes updating, by the remote control center's processor, a new physical location of the further power adapter with the physical location of the AC power output wall socket corresponding to the second socket ID.

In this embodiment, the estimation of the physical location of the further power adapter from the first and second physical locations of the AC power output wall sockets corresponding to the first and the second socket IDs is done by triangulation.

In other words, the aforementioned embodiments use the physical locations of one or more AC power output wall sockets corresponding to one or more anchor beacons that detect a floating beacon in the estimation of the physical location of the floating beacon. In these embodiments, instead of the physical locations of one or more AC power output wall sockets, the calculated or known physical locations (as recorded by the remote control center 1160) of other floating beacons that detect the floating beacon can similarly be used in the estimation of the physical location of the floating beacon.

In general, the accuracy of the estimation based on triangulation increases when there are more physical locations of the AC power output wall sockets being used. That is, the location of a floating beacon can be better estimated when it is being simultaneously (or near simultaneously) detected by more anchor beacons and/or other floating beacons having calculated or known physical locations. In other words, the more unique socket IDs and/or other floating beacons' power adaptor IDs associating with the same further power adaptor ID are extracted from power adapter location data messages within the pre-defined period of time, the higher the accuracy in the estimation of the physical location of the further power adaptor.

In other embodiments, without limitation, the estimation may include a table lookup in a pre-defined table of matching physical locations of AC power output wall sockets and corresponding proximate locations or areas stored in the non-transient memory circuit module. An ordinarily-skilled person in the art can appreciate that other methods of location estimation using information of other known locations are readily adoptable by the present invention.

Figure 13A:
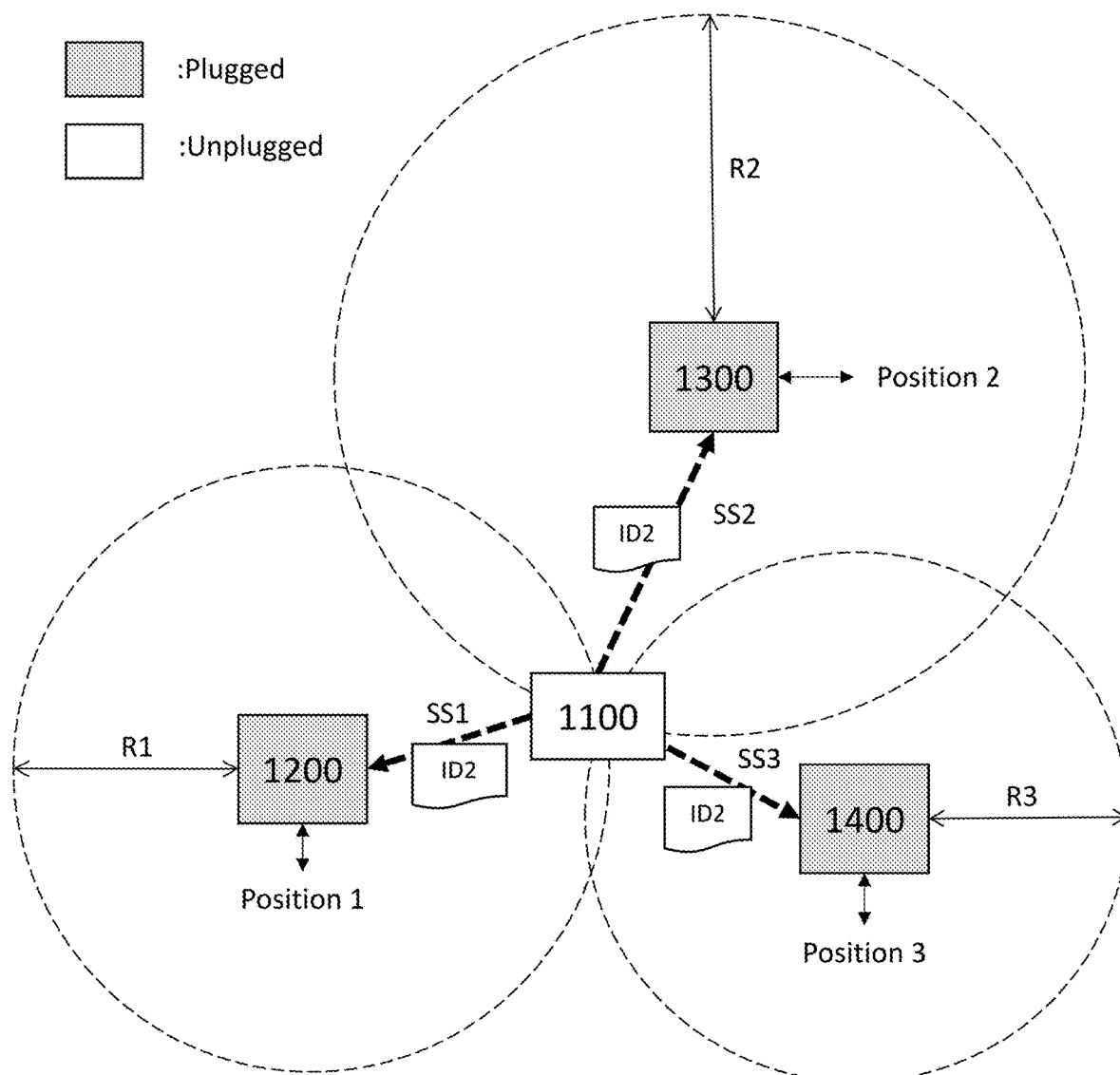
FIG. 13A depicts a schematic diagram of determining the target location of the power adapter by other three power adapters according to the last location of the power adapter and the tag information sent from the power adapter.

Referring to FIG. 13A, for example, assuming that the power adapter 1100 is acting as a floating beacon, broadcasting a beacon signal, which includes at least the power adapter ID2. In this example, power adapter 1200, power adapter 1300 and power adapter 1400 are plugged in and are acting as anchor beacons, and the beacon signal containing the power adapter ID2 is simultaneously detected and received by the beacon reader of each of these power adapters. In an alternative embodiment, the power adapter 1200 also measures and obtains a signal strength SS1 of its received beacon signal; the power adapter 1300 also measures and obtains a signal strength SS2 of its received beacon signal; and the power adapter 1400 also measures and obtains a signal strength SS3 of its received beacon signal. Then, each of the power adapters 1200-1400 generates and sends a power adapter location data message containing its respective power adapter ID and socket ID, and the power adapter ID2 to the remote control center 1160, such that the remote control center 1160 can estimate the location of the power adapter 1100 according to the locations corresponding to the socket IDs of the power adapters 1200-1400. In the alternative embodiment, each of the power adapter location data messages sent to the remote control center 1160 further contains SS1, SS2, or SS3 respectively.

In more details, the processor 1161 estimates the location of the power adapter 1100 by first obtaining AC power output wall sockets' physical locations by mapping the socket IDs extracted from the received power adapter location data messages in the location mapping table. Then, the processor 1161 determines the beacon signal detection areas each centered around each of the obtained AC power output wall sockets' physical locations, wherein each of the beacon signal detection areas is a circle of a pre-defined radius based on the technical specification of the beacon circuit modules in the power adaptors. Finally, the processor 1161 estimates the location of the power adapter 1100 being within an overlapping region of the beacon signal detection areas.

In the alternative embodiment, the beacon signal detection area corresponding to the socket ID of the power adapter 1200 is determined using a radius R1, which is extrapolated from the signal strength SS1 extracted from the received data message; the beacon signal detection area corresponding to the socket ID of the power adapter 1300 is determined using a radius R2, which is extrapolated from the signal strength SS2 extracted from the received data message; and the beacon signal detection area corresponding to the socket ID of the power adapter 1300 is determined using a radius R3, which is extrapolated from the signal strength SS3 extracted from the received data message.

In accordance with another embodiment, in response to the event that the power input plug 1101 being disengaged from the AC power output wall socket 1142 and that the tag reader 1107 losing its detection of a tag signal from tag circuit 1147, the processor 1105 sends an unplug notification data message to the remote control center 1160 via the network connection 1130, wherein the unplug notification includes: the power adapter ID of the power adapter 1100 and the socket ID of the AC power output wall socket 1142. The remote control center 1160 receives and records the received unplug notification data message. In other words, whenever the power adapter 1100 is unplugged, the remote control center 1160 is notified of the event and records as historical record data the last known socket ID associated with the power adapter 1100; and in turn the last known physical location of the power adapter 1100.

Furthermore, in one embodiment, the last known physical location of an unplugged power adapter (floating beacon) is used, along with socket IDs of the power adapters (anchor beacons) that can detect the floating beacon's broadcasted beacon signal, in the estimation of the physical location of the floating beacon.

Figure 13B:
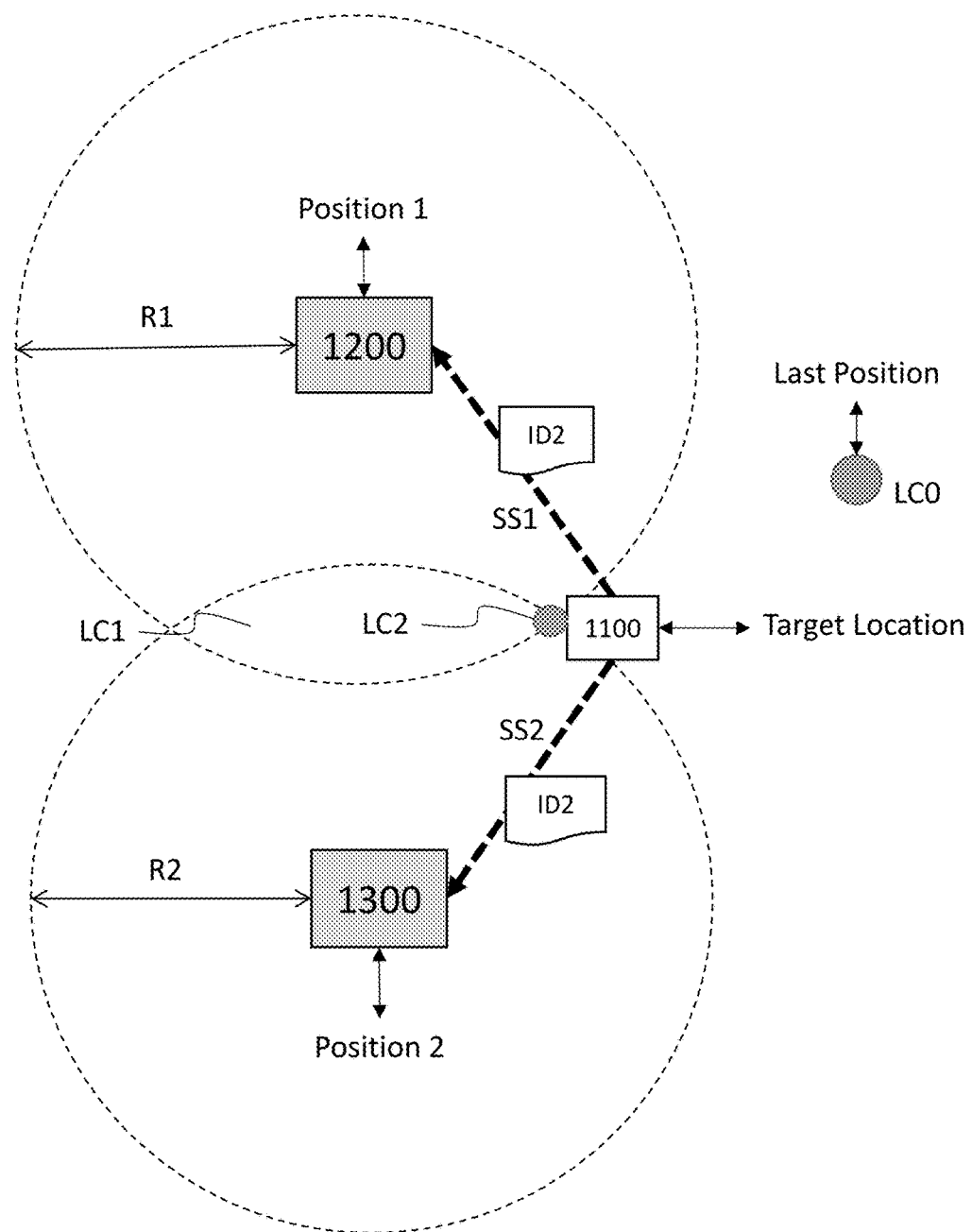
FIG. 13B depicts a schematic diagram of determining the target location of the power adapter by other two power adapters according to the tag information sent from the power adapter.

For example, referring to FIG. 13B, the unplugged power adapter 1100 operates as a floating beacon and broadcasts a beacon signal containing the power adapter ID2. In this example, power adapter 1200 and power adapter 1300 are plugged in and operate as anchor beacons. As the beacon signal containing the power adapter ID2 being detected and received by the power adapter 1200 and the power adapter 1300 with its measured beacon signal strength SS1 or SS2, each of them sends to the remote control center 1160 a power adapter location data message containing its respective power adapter ID, socket ID, the power adapter ID2, and measured beacon signal strength SS1 or SS2. The processor 1161 of the remote control center 1160 calculates the radius R1 according to the signal strength SS1, and the radius R2 according to the signal strength SS2. The processor 1161 then calculates an estimated physical location of the unplugged power adapter 1100 to be within the area LC1 according to the overlapping beacon signal detection areas corresponding to radiuses R1 and R2, and centered around Position 1 and Position 2. The processor 1161 further selects LC2 as the final estimated physical location of the power adapter 1100 according to a last known location LC0 of the power adapter 1100 since LC2 is closest to the last known location LC0.

Figure 14:
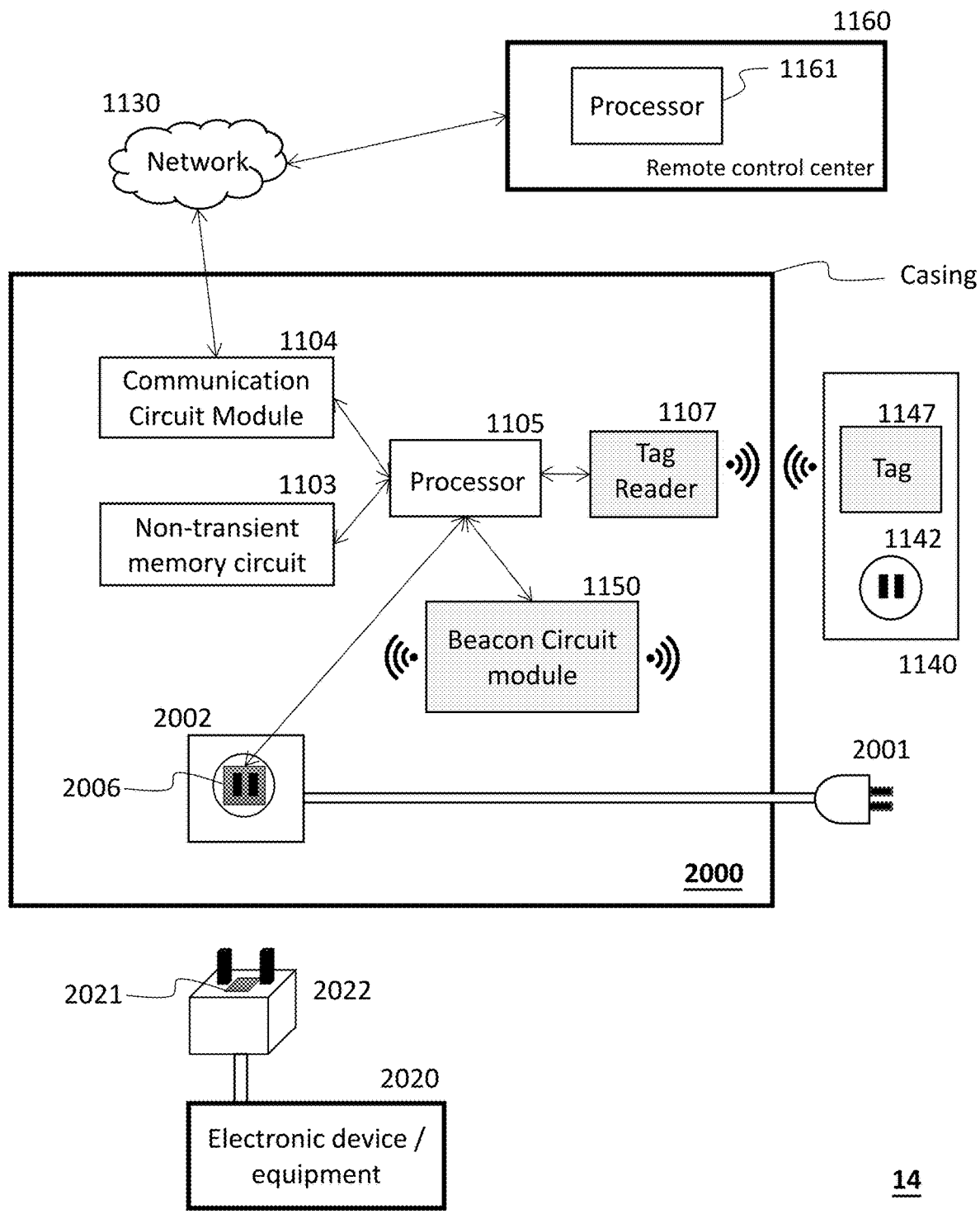
FIG. 14 depicts a block diagram of a location tracking system including a remote control center and a power adapter having a beacon circuit module according to yet another embodiment of the present invention.

Referring to FIG. 14 for the following description. In another embodiment, the system 14 includes a remote control center 1160 and a power adapter 2000. The functions of the remote control center 1160 and most circuit parts (e.g., 1103, 1104, 1105, 1107, 1150) of the power adapter 2000 are described in FIG. 11A, and the details are omitted hereto. The differences between the location tracking systems depict in FIG. 11A and FIG. 14 are: the power output socket 2002 further includes a tracked electronic device or equipment tag reader 2006, and the tracked electronic device or equipment tag reader 2006 is configured to detect a tag signal containing a tracked electronic device or equipment ID corresponding to the tracked electronic device or equipment 2020 from a tracked electronic device or equipment tag circuit 2021 of the tracked electronic device or equipment power input plug 2022. The tracked electronic device or equipment tag reader 2006 and the tracked electronic device or equipment tag circuit 2021 may be implemented using the NFC, RFID, infrared (IR), or other suitable short-range or contactless data signaling technology.

In this embodiment, when the tracked electronic device or equipment power input plug 2022 is plugged into the power output socket 2002, the tracked electronic device or equipment tag reader 2006 detects and receives a tag signal from the tracked electronic device or equipment tag circuit 2021, the processor 1105 extracts the tracked electronic device or equipment ID from the received tag signal and sends the tracked electronic device or equipment ID in a notification data message to the remote control center 1160. With the power adapter 2000 plugged in, the processor 1105 may include in the notification data message its power adapter ID and the socket ID of the AC power output wall socket 1142. This allows the remote control center 1160 to track the location of tracked electronic device or equipment 2020 along with the power adapter 2000.

On the other hand, when a plugged in tracked electronic device or equipment 2020 is unplugged from the power adapter 2000, the tracked electronic device or equipment tag reader 2006 can detect the loss of tag signal and notify the processor 1105 to sends a notification data message containing the power adapter ID, the socket ID, and a tracked electronic device or equipment unplugged status to the remote control center 1160; thus, alerting the disconnection and loss of location tracking of the tracked electronic device or equipment 2020.

In addition to using the tag reader to track tracked electronic device or equipment, the power adaptor In various embodiments, the remote control center implemented by a computer device, such as an electronic kiosk, a mobile phone, a tablet computer, a personal computer, or a server computer having at least one computer processor. The remote control center then further provides a user interface allowing a user to obtain the current location and current status of the tracked electronic device or equipment or/and the power adapter via the related historical records.

In other embodiments, an authorized user terminal, such as a smartphone, PC, laptop, or mobile electronic device having an authority to find the tracked electronic device or equipment or/and the power adapter, can connect to the remote control center to obtain the current location and current status of the tracked electronic device or equipment or/and the power adapter via the related history records.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium. The communication networks established, by the communication circuit module, in the various embodiments support various communication protocols such as, without limitation, Wi-Fi, the Global System for Mobile Communication (GSM) system, the Personal Handy-phone System (PHS), Code Division Multiple Access (CDMA) system, Worldwide Interoperability for Microwave Access (WiMAX) system, third-generation wireless communication technology (3G), fourth-generation wireless communication technology (4G), fifth-generation wireless communication technology (5G), Long-term Evolution technology (LTE), Bluetooth, and Ultra-Wideband (UWB).

The foregoing description of the present invention has been provided for the purposes of illustration and description. It is not intended to be exhaustive or to limit the invention to the precise forms disclosed. Many modifications and variations will be apparent to the practitioner skilled in the art.

What is claimed is:

1. A power adapter for location tracking of a tracked electronic device or equipment, comprising:
    a power input plug configured to engage with and disengage from an alternate current power output wall socket of a power source;
    a power output socket configured to engage with and disengage from a first power input plug of the tracked electronic device or equipment;
    a communication circuit module, configured to establish a network connection to a remote control center;
    a tag reader configured to detect a tag signal containing a socket ID from a tag circuit of the AC power output wall socket;
    a beacon circuit module; and
    a processor configured to:
        determine whether the power input plug is engaged with the AC power output wall socket by determining whether presence of the tag signal from the tag circuit is detected, or by determining whether presence of a voltage supplied by the AC power output wall socket is detected;
        if the power input plug is not engaged with the AC power output wall socket, then the power adapter is configured to function as a floating beacon by instructing the beacon circuit module to broadcast a beacon signal containing a power adapter ID of the power adapter;
        else if the power input plug is engaged with the AC power output wall socket, then the power adapter is configured to function as an anchor beacon by:
            enabling the tag reader to receive the tag signal;
            extracting the socket ID from the received tag signal;
            instructing the beacon circuit module to detect and receive a further beacon signal of a further power adapter;
            extracting a further power adapter ID of the further power adapter from the received further beacon signal;
            generating a power adapter location data message containing the power adapter ID, the socket ID, and the further power adapter ID; and
            sending the power adapter location data message to a remote control center;
    wherein the remote control center is configured to:
        receive the power adapter location data message;
        extract from the received power adapter location data message the power adapter ID, the socket ID, and the further power adapter ID;
        determine a physical location of the power adapter corresponding to the extracted power adapter ID by matching the extracted socket ID to a physical location of a corresponding AC power output wall socket in a location mapping table; and
        estimate an estimated physical location of the further power adapter corresponding to the extracted further power adapter ID from the determined physical location of the power adapter.

2. The power adapter of claim 1,
wherein the estimated physical location of the further power adapter is within a beacon signal detection area of a pre-determined size centered around the determined physical location of the power adapter corresponding to the extracted power adapter ID.

3. The power adapter of claim 1,
wherein the processor is further configured to:
    if the power input plug is engaged with the AC power output wall socket:
        instruct the beacon circuit module to measure a further beacon signal strength of the detected further beacon signal; and
        generate a power adapter location data message containing the power adapter ID, the socket ID, the further power adapter ID, and the further beacon signal strength;
    wherein the remote control center is further configured to:
        extract from the received power adapter location data message the power adapter ID, the socket ID, the further power adapter ID, and the further beacon signal strength;
        wherein the estimated physical location of the further power adapter is within a beacon signal detection area of a size computed from the further beacon signal strength centered around the determined physical location of the power adapter corresponding to the extracted power adapter ID.

4. The power adapter of claim 1,
wherein when the power adapter is functioning as a floating beacon, and when the broadcasted beacon signal is detected and received by a plurality of other power adapters with calculated or known physical locations:
    the remote control center is further configured to estimate an estimated physical location of the power adapter functioning as a floating beacon, the estimation comprises:
        determining a beacon signal detection area of a pre-determined size centered around a physical location of each of the other power adapters that detects the broadcasted beacon signal; and
        estimating the estimated physical location of the power adapter functioning as a floating beacon to be within an overlapping region of the determined beacon signal detection areas.

5. The power adapter of claim 1,
wherein when the power adapter is functioning as a floating beacon, and when the broadcasted beacon signal is detected and received by one or more of other power adapters with calculated or known physical locations:
    the remote control center is further configured to estimate an estimated physical location of the power adapter functioning as a floating beacon comprises:
        retrieving from historical record data a last known socket ID associated with the power adapter;
        determining a last known physical location of the power adapter from the last known socket ID;
        determining a beacon signal detection area of a pre-determined size centered around a physical location of each of the other power adapters that detects the broadcasted beacon signal;
        if more than one other power adapters functioning as anchor beacons detect the broadcasted beacon signal, estimating the estimated physical location of the power adapter functioning as a floating beacon to be a location within an overlapping region of the determined beacon signal detection areas that is closest to the last known physical location of the power adapter;

else if only one other power adapter functioning as anchor beacon detects the broadcasted beacon signal, estimating the estimated physical location of the power adapter functioning as a floating beacon to be a location within the determined beacon signal detection area that is closest to the last known physical location of the power adapter.

6. The power adapter of claim 1, wherein when the power adapter is functioning as a floating beacon, and when the broadcasted beacon signal is detected and received by a plurality of other power adapters with calculated or known physical locations:

the remote control center is further configured to estimate an estimated physical location of the power adapter functioning as a floating beacon comprises:

determining a beacon signal detection area of a size computed from a further beacon signal strength centered around a physical location of each of the other power adapters that detects the broadcasted beacon signal;

estimating the estimated physical location of the power adapter functioning as a floating beacon to be within an overlapping region of the determined beacon signal detection areas.

7. The power adapter of claim 1, wherein when the power adapter is functioning as a floating beacon, and when the broadcasted beacon signal is detected and received by one or more of other power adapters with calculated/known physical locations:

the remote control center is further configured to estimate an estimated physical location of the power adapter functioning as a floating beacon comprises:

retrieving from historical record data a last known socket ID associated with the power adapter;

determining a last known physical location of the power adapter from the last known socket ID;

determining a beacon signal detection area of a size computed from the further beacon signal strength centered around a physical location of each of the other power adapters functional as anchor beacons that detects the broadcasted beacon signal;

if more than one other power adapters functioning as anchor beacons detect the broadcasted beacon signal, estimating the estimated physical location of the power adapter functioning as a floating beacon to be a location within an overlapping region of the determined beacon signal detection areas that is closest to the last known physical location of the power adapter;

else if only one other power adapter functioning as anchor beacon detects the broadcasted beacon signal, estimating the estimated physical location of the power adapter functioning as a floating beacon to be a location within the determined beacon signal detection area that is closest to the last known physical location of the power adapter.

8. The power adapter of claim 1, further comprising a tracked electronic device or equipment tag reader configured to detect a tracked electronic device or equipment tag signal containing a tracked electronic device or equipment ID corresponding to the tracked electronic device or equipment from a tracked electronic device or equipment tag circuit;

wherein the processor is further configured to:

determine a plug-in status of the tracked electronic device or equipment by detecting the presence or loss of the tracked electronic device or equipment tag signal;

if the plug-in status changes from unplugged to plugged, generate a notification data message containing the power adapter ID, the socket ID, and the tracked electronic device or equipment ID extracted from the tracked electronic device or equipment tag signal;

else if the plug-in status changes from unplugged to plugged, generate a notification data message containing the power adapter ID, the socket ID, and a tracked electronic device or equipment unplugged status;

send the notification data message to the remote control center.

* * * * *